United States Patent
Døssing

(10) Patent No.: US 12,184,723 B1
(45) Date of Patent: Dec. 31, 2024

(54) NODAL WORK ASSIGNMENTS IN CLOUD COMPUTING

(71) Applicant: CrowdStrike, Inc., Irvine, CA (US)

(72) Inventor: Stig Rohde Døssing, Aarhus V (DK)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/358,994

(22) Filed: Jul. 26, 2023

(51) Int. Cl.
*H04L 67/1031* (2022.01)
*G06F 9/50* (2006.01)

(52) U.S. Cl.
CPC ........ *H04L 67/1031* (2013.01); *G06F 9/5027* (2013.01)

(58) Field of Classification Search
CPC ............................ H04L 67/1031; G06F 9/5027
USPC ......................................................... 709/224
See application file for complete search history.

(56) References Cited

U.S. PATENT DOCUMENTS

| | | | |
|---|---|---|---|
| 6,507,905 B1 | 1/2003 | Hubacher et al. | |
| 9,152,664 B2 | 10/2015 | Abrink | |
| 9,305,074 B2 | 4/2016 | Teletia et al. | |
| 9,489,443 B1 | 11/2016 | Muniswamy-Reddy et al. | |
| 9,996,572 B2 | 1/2018 | Calder et al. | |
| 9,893,940 B1 * | 2/2018 | Chawla | H04L 41/082 |
| 10,031,962 B2 | 7/2018 | Cao et al. | |
| 10,067,969 B2 | 9/2018 | Rice et al. | |
| 11,093,522 B2 | 8/2021 | Wang et al. | |
| 2020/0186411 A1 * | 6/2020 | Ravichandran | H04L 41/0659 |
| 2020/0310837 A1 * | 10/2020 | Sethumadhavan | G06F 9/451 |
| 2020/0410418 A1 * | 12/2020 | Martynov | G06F 16/122 |
| 2022/0050858 A1 * | 2/2022 | Karr | G06F 11/3466 |
| 2022/0138150 A1 * | 5/2022 | Chmiel | G06F 16/162 707/649 |
| 2023/0153010 A1 * | 5/2023 | Kapadia | G06F 3/0652 711/154 |
| 2023/0409405 A1 * | 12/2023 | Bansod | G06F 9/505 |
| 2023/0409590 A1 * | 12/2023 | Shah | G06F 16/254 |
| 2023/0418651 A1 * | 12/2023 | Prabhu | G06F 9/45558 |

FOREIGN PATENT DOCUMENTS

| | | |
|---|---|---|
| WO | 2015200374 | 12/2015 |
| WO | 2015200375 | 12/2015 |

* cited by examiner

*Primary Examiner* — Karen C Tang
(74) *Attorney, Agent, or Firm* — Law Office of Scott P. Zimmerman

(57) ABSTRACT

Nodal work assignments efficiently distribute server work items, such as storing redundant copies of electronic data. A cloud computing network establishes a policy that governs how and where the redundant copies are stored cloud computing nodes (such as by region, zone, and cluster targets). The cloud computing network repeatedly or continuously re-evaluates the work assignments based on replication assignment skews and/or leadership penalties. The nodal work assignments thus minimize hardware and software operations, network traffic, and electrical energy consumption.

20 Claims, 24 Drawing Sheets

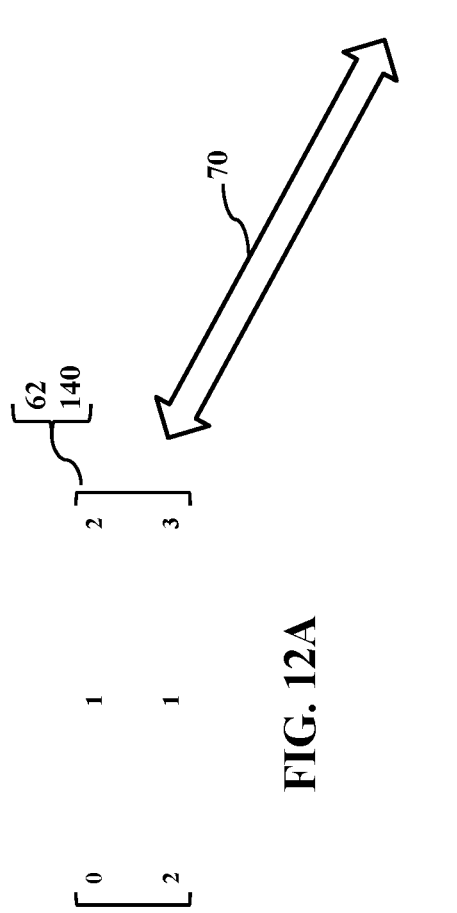
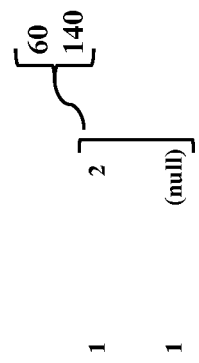
FIGs. 12A-12B
FIG. 12A
FIG. 12B

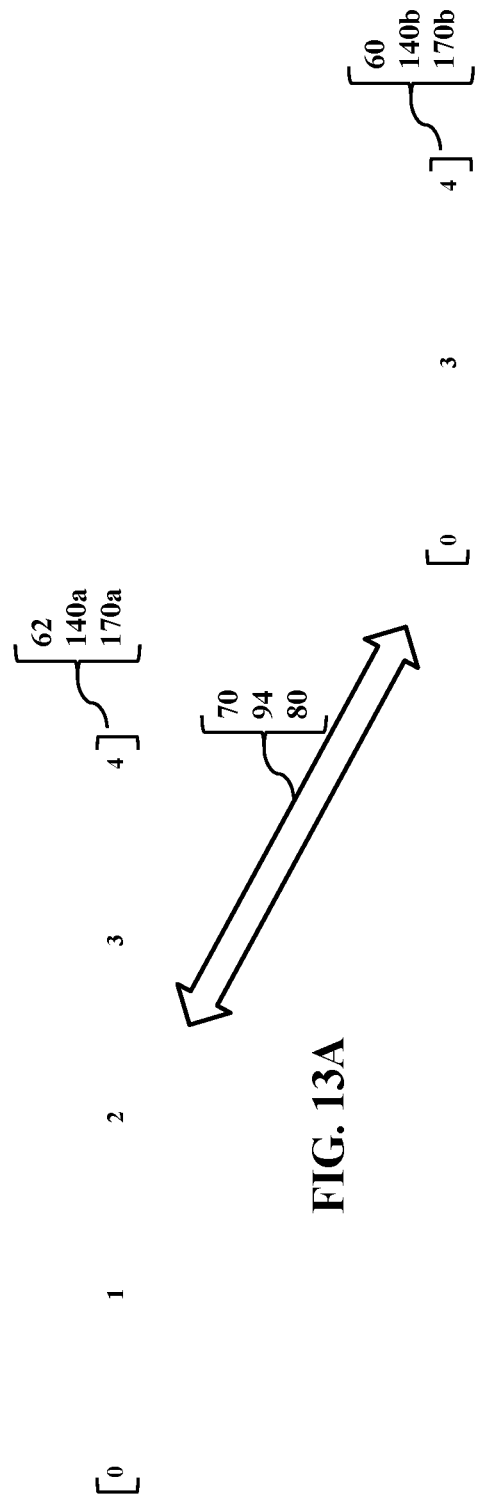

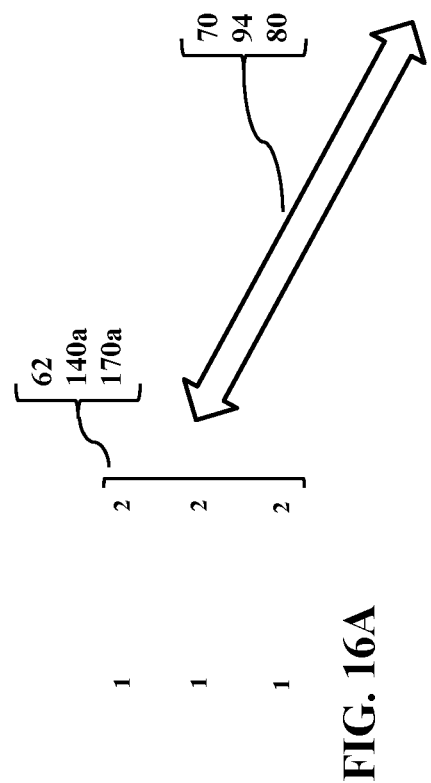
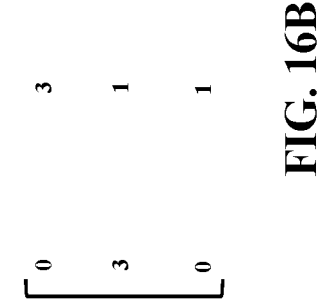
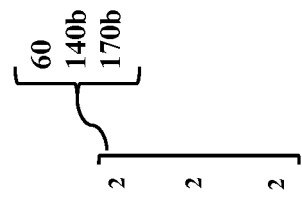
FIGs. 16A-16B
FIG. 16A
FIG. 16B

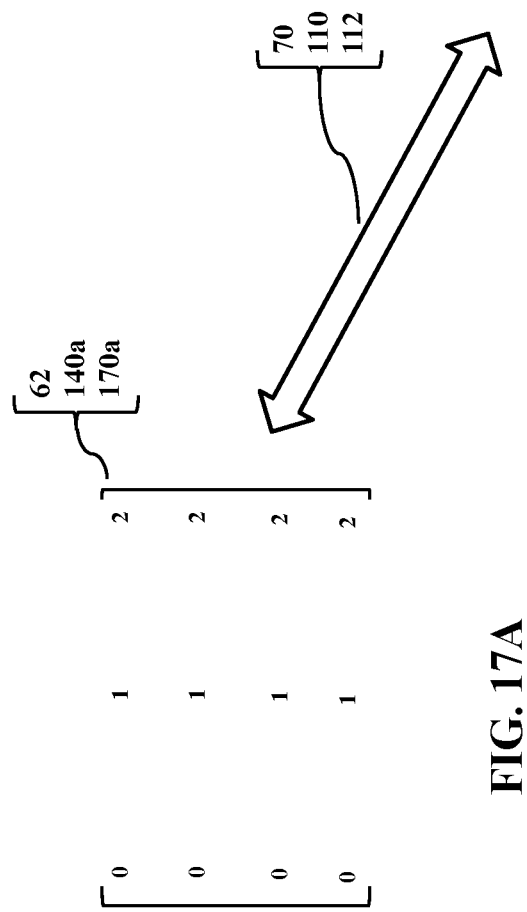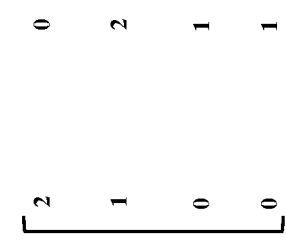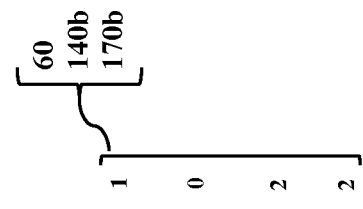

NODAL WORK ASSIGNMENTS IN CLOUD COMPUTING

BACKGROUND

The subject matter described herein generally relates to computers and to computer networks and, more particularly, the subject matter relates to data redundancy, to digital data information retrieval, and to database structures therefor.

Data centers and other networks implement data redundancy mechanisms. Redundant copies of data are maintained to ensure availability and reliability. Maintaining redundant copies of data, though, creates expensive networking problems. The redundant copies of data cause network congestion and consume precious network bandwidth. The redundant copies of data also require excessive computer resources that degrade computer hardware performance and network performance. Data redundancy mechanisms should thus only be performed when needed.

SUMMARY

Constant improvements to nodal work assignments efficiently distribute redundant work items, such as redundant copies of electronic data. A cloud computing network provides a cloud-based service. A policy governs the service, and the policy may specify how many of the redundant work items must be maintained. The policy may also establish or define storage targets by region, zone, and cluster. The cloud computing network may then generate work assignments that define which cloud computing nodes execute the redundant work items, such as by storing the redundant copies. The cloud computing network, however, may repeatedly or continuously re-evaluate the work assignments to implement incremental improvements. The cloud computing network, for example, may determine replication assignment skews associated with the cloud computing nodes. The cloud computing network may then regenerate the work assignments based on the replication assignment skews. The cloud computing network may also assign additional cloud computing nodes, or remove existing cloud computing nodes, based on the replication assignment skews and any regional/zonal/clusteral storage targets. The cloud computing network may also modify the work assignments based on leadership penalties. The cloud computing network may thus repeatedly or continuously generate new versions of the work assignments that reduce hardware and software operations, that reduce network traffic, and that reduce electrical energy consumption.

BRIEF DESCRIPTION OF THE SEVERAL VIEWS OF THE DRAWINGS

The features, aspects, and advantages of cloud services malware detection are understood when the following Detailed Description is read with reference to the accompanying drawings, wherein:

FIGS. 12A-17B illustrate examples of tabular rules;

DETAILED DESCRIPTION

Some examples relate to redundant work assignments across cloud computing nodes. More specifically, some examples relate to the storing of redundant copies of electronic data, but examples are not limited to this application and may include, for instance, work assignments related to redundant data processing tasks. As we all know, it's best that we regularly backup our computers, smartphones, and other devices. Backups help prevent data loss. The same best practices are also true for computer networks. Cloud providers of cloud services (such as ZOOM® conferencing, MICROSOFT OFFICE 365®, and APPLE ICLOUD®) must also maintain backup copies of electronic data. Indeed, a cloud computing network usually maintains multiple redundant copies to ensure data integrity and availability. The cloud computing network, though, may have hundreds or even thousands of nodes (such as servers and other devices) that store electronic data. Storing redundant copies of data among these hundreds or thousands of nodes, though, congests the cloud computing network with packet traffic and greatly consumes computer hardware and software resources. Moreover, transferring and storing the redundant copies among these hundreds or thousands of nodes wastes much electrical energy. This disclosure, instead, describes elegant examples of minimal and efficient redundant storage. The cloud computing network establishes a policy that governs how many of the redundant copies are required. The policy may also specify where within the cloud computing network (such as by region, zone, and cluster targets) that the redundant copies must be stored. A work assignment server, affiliated with the cloud computing network, may then assign work items, for example, which nodes store the redundant copies. The work assignment server, though, may continually refine the work items or work assignments. That is, the work assignment server may periodically or even continuously re-evaluate and modify the work assignments as conditions change. Because the cloud computing network may have hundreds or even thousands of the nodes, the cloud computing network may always be changing. Some nodes, for example, may go offline and be unavailable. Other nodes appear online and become available. Still other nodes may have full memories and can't store a redundant copy. Still more nodes may be too busy with other work and can't store a redundant copy. Whatever the reason(s), the cloud computing network may dynamically change, so the work assignment server may dynamically re-evaluate and regenerate new versions of the work assignments as conditions change. These repeated, perhaps incremental revisions of the work assignments greatly reduce the number of redundant copies that are transferred between the hundreds or thousands of nodes. Continuous improvement of the work assignments reduces hardware and software operations, reduces network traffic, and reduces electrical energy consumption.

Figure 1:
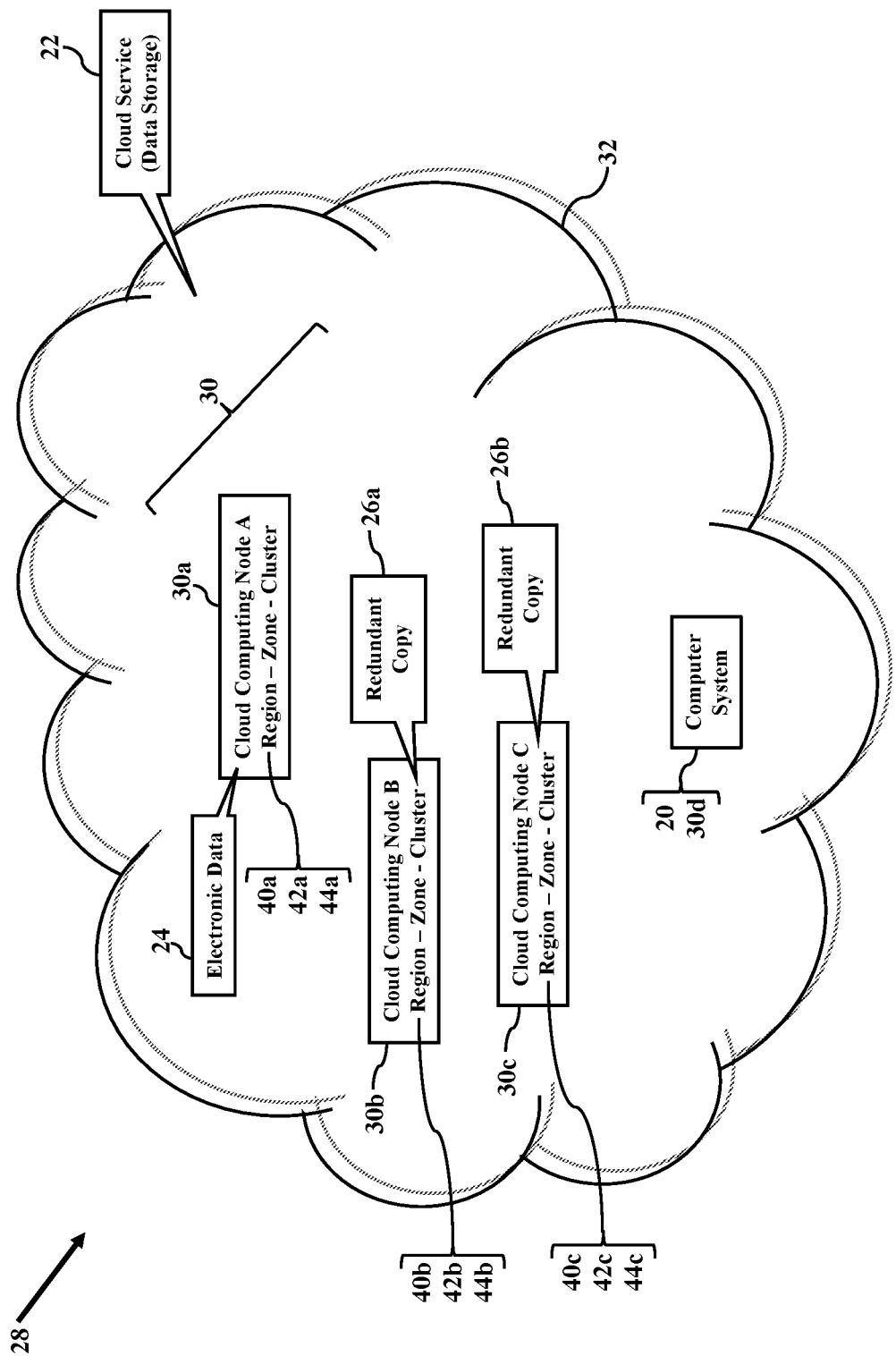
FIGS. 1-3 illustrate some examples of data redundancy.
Figure 2:
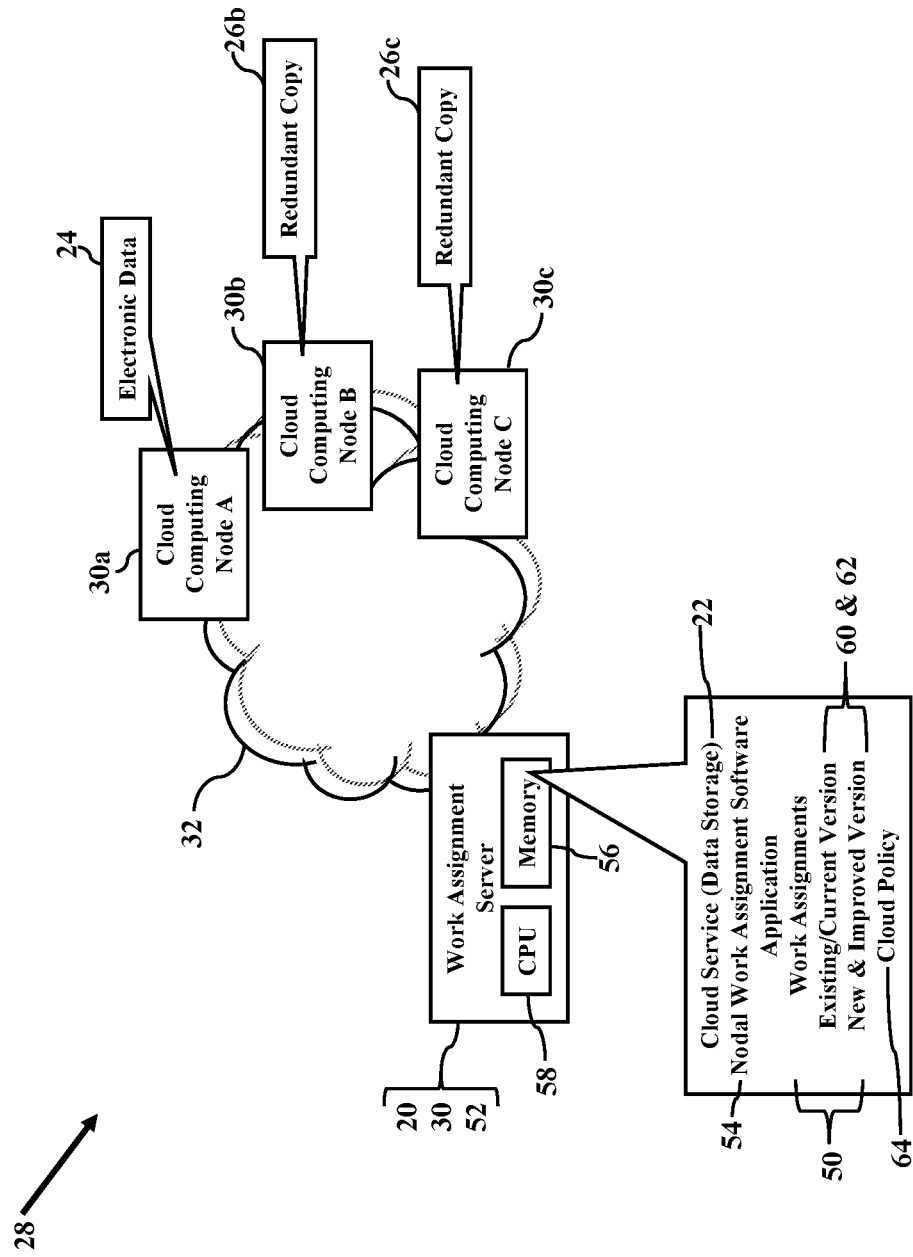
Figure 3:
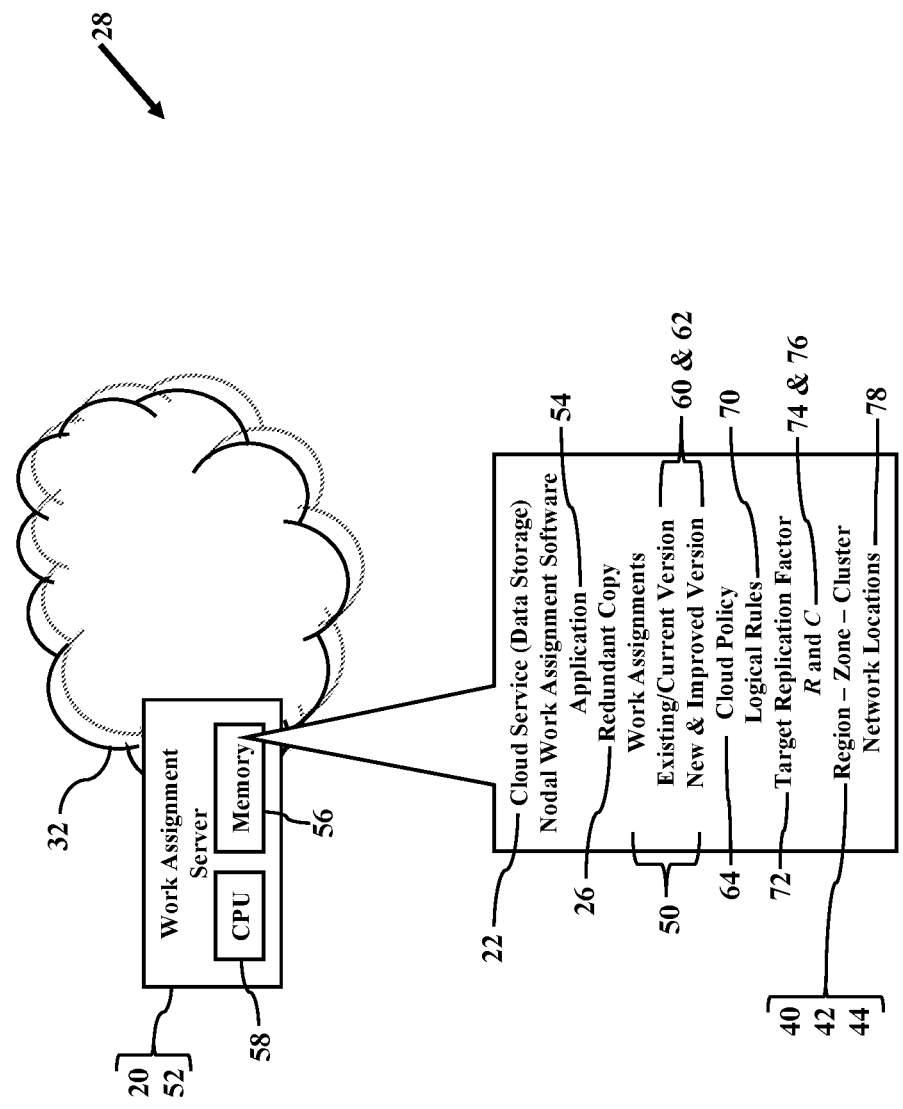

FIGS. 1-3 illustrate some examples of data redundancy. A computer system 20 participates in a cloud service 22. The cloud service 22 stores any electronic data 24. The cloud service 22, though, also stores and maintains multiple, redundant copies 26 of the electronic data 24. The electronic data 24, for example, may be a customer's computer file (e.g., a photo, movie, or music) and associated with a filename or other identifier. The electronic data 24 may also be personal/employee/business records, health information, or other computer file(s). The electronic data 24, though, may only be a portion or part of a file, for example, a spreadsheet column/row shard. The electronic data 24 may be any data segment, element, object, or structure regardless of size or content. Whatever the bits/bytes making up the electronic data 24, best practices often require the multiple, redundant copies 26 to ensure data integrity and availability.

FIG. 1 illustrates the cloud service 22. In this example, a cloud computing network 28 distributes and stores the multiple, redundant copies 26 of the electronic data 24. The cloud computing network 28 may have several, or even hundreds or thousands, of servers, routers, switches, devices, computers, or other cloud computing nodes 30. The cloud computing nodes 30 communicatively interface via communications networks 32 (e.g., public Internet, private network, and/or hybrid network). Because the cloud computing network 28 may distribute and store both the electronic data 24 and its redundant copies 26, the computer system 20 may be configured as a work manager of the cloud-based cloud service 22. The computer system 20, in other words, may decide which of the cloud computing nodes 30 performs the work items, such as retrieving and the storing of one or more of the redundant copies 26. As a simple example, suppose a first cloud computing node 30a stores a true or original version of the electronic data 24. Another cloud computing node 30b stores a redundant copy 26a of the electronic data 24. Best practices may even require that yet another cloud computing node 30c store another redundant copy 26b. The cloud computing nodes 30a-c may even be preferably located in different regions 40, in different zones 42, and/or in different clusters 44 to further ensure data integrity and availability. The electronic data 24 and the multiple, redundant copies 26a-c may thus be distributed by the cloud computing network 28 to prevent loss or corruption due to hardware failure, natural disaster, or malicious actor.

The computer system 20 manages the multiple, redundant copies 26a-c. The computer system 20, as a manager, determines which of the cloud computing nodes 30 should store the redundant copies 26. While FIG. 1 simply illustrates the three (3) cloud computing node 30a-c, in actual practice the cloud computing network 28 may have hundreds or even thousands of the cloud computing nodes 30. Moreover, in actual practice, the cloud computing nodes 30 may be geographically and/or logically dispersed according to the different regions 40, zones 42, and/or clusters 44. The computer system 20 thus determines and tracks which of the cloud computing nodes 30 should perform the hardware and software work items, such as acquiring and storing the redundant copies 26.

FIG. 2 illustrates work assignments 50. As the computer system 20 operates, the computer system 20 is programmed to manage the cloud computing nodes 30 providing the cloud service 22. The computer system 20, in particular, generates the work items or assignments 50 that identify which of the cloud computing nodes 30 stores the original electronic data 24 and its redundant copies 26. The computer system 20, in other words, assigns the work or tasks (e.g., read/write operations, input/output operations, and nodal communications) that ensure the cloud computing network 28 distributes and stores the proper number of the redundant copies 26. FIG. 2 illustrates the computer system 20 as a work assignment server 52 operating within the cloud computing network 28. As the work assignment server 52 receives electrical power and operates, the work assignment server 52 hosts (e.g., locally stores and executes) a nodal work assignment software application 54. The work assignment server 52 stores the nodal work assignment software application 54 in a local memory device 56, and at least one hardware processor 58 executes the nodal work assignment software application 54. The nodal work assignment software application 54 has programming code or instructions that cause the work assignment server 52 to perform operations, such as generating a new version 60 of the work assignments 50 by modifying a previous, existing, or current version 62 according to a cloud policy 64. That is, the nodal work assignment software application 54 instructs or causes the work assignment server 52 to retrieve the current version 62 of the work assignments 50 and to incrementally generate the new version 60 of the work assignments 50 based on the cloud policy 64.

FIG. 3 further illustrates the cloud policy 64. The cloud computing network 28 establishes, specifies, and/or distributes the cloud policy 64. The cloud policy 64 specifies one or more goals and/or parameters associated with the cloud service 22. The computer system 20 (again illustrated as the nodal work assignment server 52) retrieves or downloads the cloud policy 64 from the cloud computing network 28. The nodal work assignment server 52 reads the goals and/or parameters specified by the cloud policy 64. The nodal work assignment server 52 may then execute logical rules 70 that modify the existing or current version 62 of the work assignments 50 to generate the new version 60 of the work assignments 50. The nodal work assignment server 52 generates the new version 60 of the work assignments 50 that conforms to the goals and/or parameters established or specified by the cloud policy 64.

The cloud policy 64 may thus govern the cloud service 22. The cloud policy 64, for example, may specify a target replication factor 72. The target replication factor 72 defines how many redundant copies R (illustrated as reference numeral 74) that are required to be stored by the cloud computing network 28. The cloud policy 64 may also identify how many redundant copies C (illustrated as reference numeral 76) are currently stored by the cloud computing network 28. The cloud policy 64 may even further specify how many of the redundant copies R should be stored by, or limited by, according to the region 40, zone 42, and/or cluster 44. The cloud policy 64 may further specify the network locations 78 (e.g., the region 40, zone 42, cluster 44, and/or IP address) associated with each currently-existing C redundant copy 26. The nodal work assignment software application 54 may then instruct or cause the work assignment server 52 to generate the new version 60 of the work assignments 50 by modifying the existing/older/current version 62, perhaps according to the logical rules 70 based on R, C, and/or the network locations 78.

Figure 4:
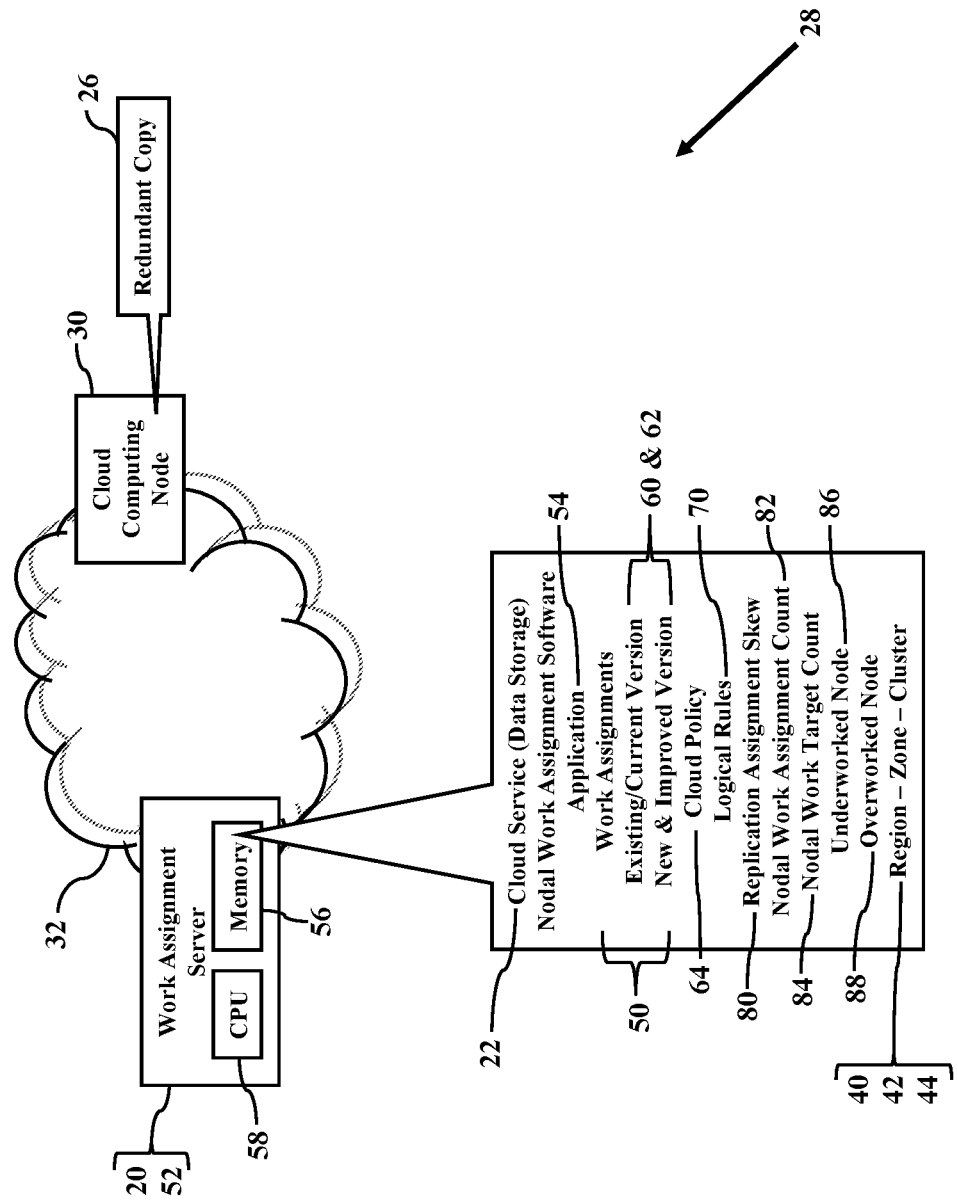
FIG. 4 illustrates examples of a cloud storage policy.

FIG. 4 illustrates more examples of the cloud policy 64. The cloud policy 64 may also specify a replication assignment skew 80. Because the nodal work assignment server 52 tracks the work or tasks assigned to any cloud computing node 30, the replication assignment skew 80 represents a measure of the work or tasks assigned to that same corresponding cloud computing node 30. The nodal work assignment software application 54, for example, may instruct the work assignment server 52 to execute one or more of the logical rules 70 that determine a nodal work assignment count 82 assigned to a corresponding cloud computing node 30. The work assignment server 52, for example, may read the existing/older/current version 62 of the work assignments 50 and count how many times the particular cloud computing node 30 appears in the existing/older/current version 62. The nodal work assignment software application 54 may then instruct the work assignment server 52 to read the cloud policy 64 for a corresponding nodal work target count 84. The cloud policy 64 may specify nodal work target counts 84 for any, some, or all of the cloud computing nodes 30. The work assignment server 52 may query the cloud policy 64 for a nodal identifier associated with any desired cloud computing node 30 and may identify/retrieve the corresponding nodal work target count 84. Once the nodal work assignment count 82 and the nodal work target count 84 are determined for the corresponding individual cloud computing node 30, the nodal work assignment software application 54 may execute the logical rule 70 that causes the work assignment server 52 to determine the replication assignment skew 80 by comparing the nodal work assignment count 82 and the nodal work target count 84. If the actual work assignment count 82 is less than the nodal work target count 84, then the nodal work assignment software application 54 may cause the work assignment server 52 to determine that the corresponding cloud computing node 30 is under-assigned or an underworked condition 86. Conversely, if the actual work assignment count 82 is greater than the nodal work target count 84, then the nodal work assignment software application 54 may cause the work assignment server 52 to determine that the corresponding cloud computing node 30 is over-assigned or an overworked condition 88.

The new version 60 of the work assignments 50 may be generated based on the replication assignment skew 80. The nodal work assignment software application 54 instructs the work assignment server 52 to execute the logical rules 70 that modify the existing/older/current version 62 of the work assignments 50, perhaps based on the replication assignment skew 80. As another simple example, the desired nodal work target count 84 may be specified without regard for nodal server zoning constraints. The nodal work target count 84 may thus be an ideal goal when disregarding rules or requirements by the region 40, zone 42, and/or cluster 44. The nodal work assignment software application 54 may thus cause the work assignment server 52 to calculate the replication assignment skew 80 as a comparative difference between the current nodal work assignment count 82 and the ideal nodal work target count 84. For instance, when counting appearances in the existing/older/current version 62 of the work assignments 50, a nodal host 30 having one (1) less work assignment less than the ideal nodal work target count 84 would have the replication assignment skew 80 of minus or negative one (or −1). Conversely, if the nodal host 30 appears once too often in the existing/older/current version 62, then the replication assignment skew 80 may be a positive one (or +1). The logical rule(s) 70 may cause nodal work assignment software application 54 to determine the replication assignment skew 80 for every corresponding cloud computing node 30 listed in existing/older/current version 62 of the work assignments 50 and/or for any/all nodes 20 associated with the cloud computing network 28. The nodal work assignment software application 54 may then instruct or cause the work assignment server 52 to generate the new version 60 of the work assignments 50 by executing the logical rule(s) 70 that modify existing/older/current version 62, perhaps based on any or all of the replication assignment skews 80.

As FIG. 4 illustrates, the nodal work target count 84 reflects work capabilities. Each cloud computing node 30 is, at least ideally, capable of performing a quantity or count of work or tasks associated with the cloud-based service 22. Each cloud computing node's corresponding nodal work target count 84, though, may likely depend on hardware and software resources. New servers with fast processors and greater memory, for example, may have a higher/greater performance and thus higher/greater nodal work target counts 84. Old servers with slow processors and small memory, conversely, may have lower/lesser performance and thus smaller nodal work target counts 84. Each cloud computing node's corresponding ideal nodal work target count 84 may thus be a reflection or measure of CPU cores and speeds, memory byte space and speed, networking interfaces, and/or any other performance or preference criteria. The nodal work assignment software application 54 may instruct or cause the work assignment server 52 to generate the new version 60 of the work assignments 50 by modifying the existing/older/current version 62 perhaps based on the logical rule(s) 70 specifying performance measures represented by the replication assignment skews 80.

The work assignments 50 may be improved regardless of the service. The above paragraphs mainly discuss the redundant copies 24 for the data-storage cloud service 22. However, the new version 60 of the work assignments 50 may be generated for any cloud-based service that stores and accesses multiple copies of any electronic data 24. Most services or software applications maintain/store the redundant copies 24 of its/their particular electronic data 24. The nodal work assignment software application 54 may thus be deployed to modify the work assignments 50 associated with any cloud-based service or application.

Figure 5:
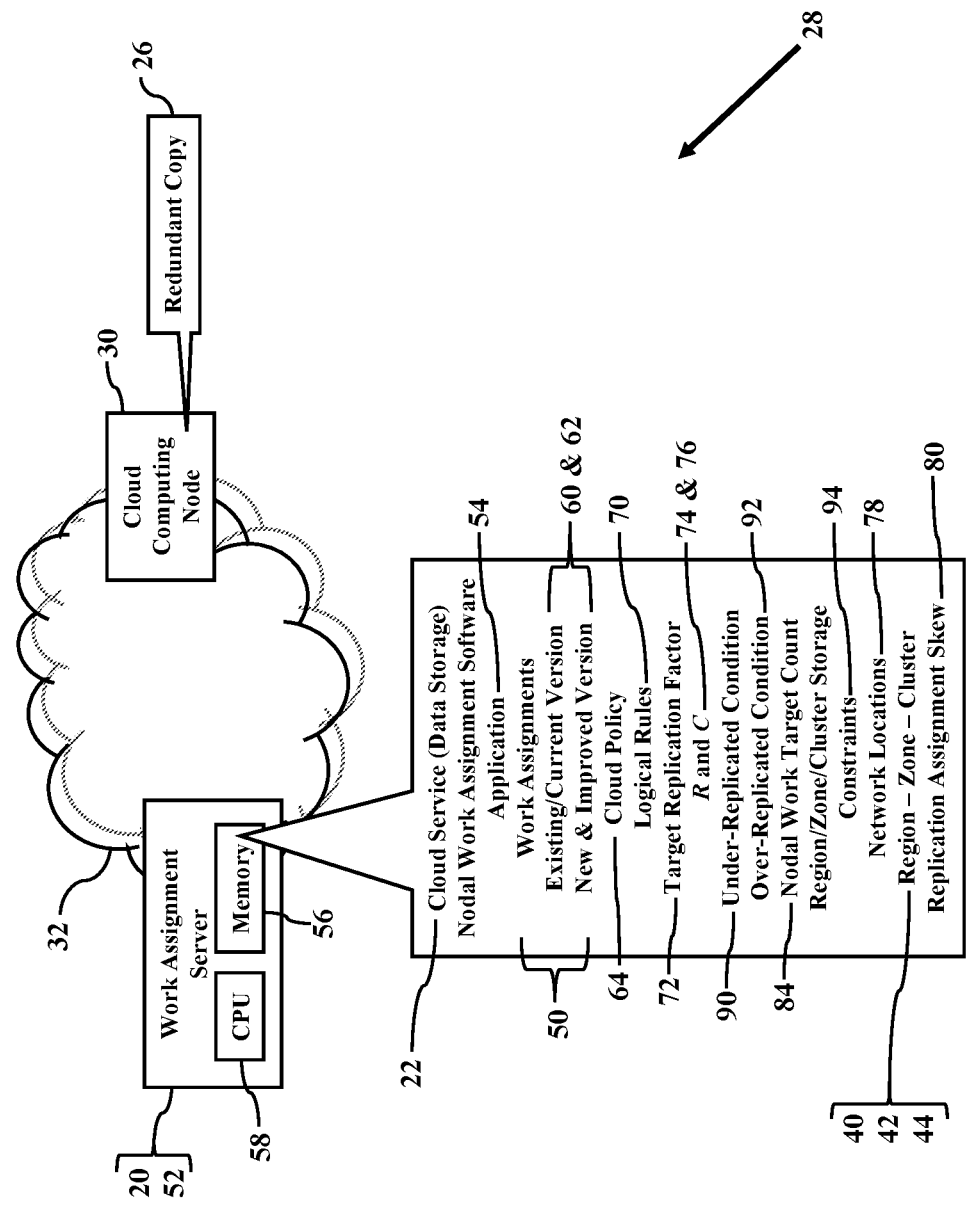
FIG. 5 illustrates examples of modified work assignments.

FIG. 5 illustrates more examples of modified work assignments 50. The logical rule(s) 70 may cause the nodal work assignment software application 54 to modify the work assignments 50 according to the target replication factor 72. The nodal work assignment software application 54 instructs the work assignment server 52 to identify the target replication factor 72 (perhaps, for example, by reading the cloud policy 64). The target replication factor 72 defines how many R of the redundant copies (illustrated as reference numeral 74) that are required to be stored by the cloud computing network 28. The target replication factor 72, for example, may specify how many R cloud computing nodes 30 should appear, or be counted, in the work assignments 50. The nodal work assignment software application 54 may then instruct the work assignment server 52 to determine or count the current number of redundant copies C (illustrated as reference numeral 76) that are currently stored by the cloud computing network 28 (perhaps as specified or identified by the existing/older/current version 62).

The work assignment server 52 may then make comparison counts. The logical rules 70, for example, may cause the nodal work assignment software application 54 to compare R to C. When the hardware processor 58 determines that C<R, the nodal work assignment software application 54 determines an under-replicated condition 90. That is, the existing/older/current version 62 of the work assignments 50 reveals that the cloud computing network 28 should increase the current count C to achieve R. Conversely, when C>R, the nodal work assignment software application 54 determines an over-replicated condition 92. That is, the existing/older/current version 62 of the work assignments 50 reveals that the cloud computing network 28 should decrease the current count C to achieve R. The logical rule(s) 70 may then cause the nodal work assignment software application 54 to generate the new version 60 of the work assignments 50 by modifying the existing/older/current version 62 perhaps based on the under-replicated condition 90 and/or the over-replicated condition 92.

Nodal addition and subtraction may be based on the cloud policy 64. Recall that the cloud policy 64 may specify the target replication factor 72 for the electronic data 24 (illustrated in FIG. 1) and the ideal nodal work target count 84 for each cloud computing node 30. The cloud policy 64, in other words, may define how many redundant copies R (illustrated as reference numeral 74) that are required to be stored by the cloud computing network 28. The cloud policy 64, however, may also specify any regional/zonal/clusteral storage constraints 94. The cloud policy 64, in other words, may specify how many of the redundant copies R are stored according to the region 40, zone 42, and/or cluster 44. The cloud policy 64 may also identify how many redundant copies C (illustrated as reference numeral 76) are currently stored by the cloud computing network 28. The cloud policy 64 may further specify the network locations 78 (e.g., the region 40, zone 42, and/or cluster 44) associated with each currently-existing C redundant copy 26. The nodal work assignment software application 54 may then cause the hardware processor 58 to increase or decrease the current count C of the cloud computing nodes 30 to achieve the target R. Because each redundant copy 26 may be separately stored in different hardware, the nodal work assignment software application 54 may adjust the current count C of the cloud computing nodes 30 to achieve the target R.

The nodal work assignment software application 54 may modify the existing/older/current version 62 of the work assignments 50. The nodal work assignment software application 54 instructs the work assignment server 52 to inspect the existing/older/current version 62 and to identify/count entries, assignments, or occurrences that correspond to the current count C of the cloud computing nodes 30. The nodal work assignment software application 54 may then instruct the hardware processor 58 to compare C to R. The logical rules 70 may then cause the nodal work assignment software application 54 to add one or more additional cloud computing nodes 30, or to remove one or more existing cloud computing nodes 30, to achieve C=R. While any mechanism may be used to add/remove nodes 30, FIG. 5 illustrates nodal selection according to the replication assignment skew 80 and the regional/zonal/clusteral constraints 94. Recall that the cloud policy 64 may specify how many of the redundant copies R (illustrated as reference numeral 74) are stored according to the region 40, zone 42, and/or cluster 44. When the nodal work assignment software application 54 needs to increase or decrease the cloud computing nodes 30 to achieve C=R, the nodal work assignment software application 54 may select additional cloud computing nodes 30, or may remove currently-assigned cloud computing nodes 30, based on the replication assignment skew 80 and the regional/zonal/clusteral constraints 94.

As a simple example, suppose the nodal work assignment software application 54 must add work assignments 50. That is, to ensure C=R, the nodal work assignment software application 54 inputs the existing/older/current version 62 of the work assignments 50 and adds a candidate cloud computing node 30 to make C=R. The nodal work assignment software application 54 may thus identify the candidate cloud computing node(s) 30 by determining and by comparing their respective replication assignment skews 80 and the regional/zonal/clusteral constraints 94. If, for example, a particular zone 42 of the cloud computing nodes 30 is well represented/populated in the work assignments 50 (perhaps as compared to other zones), then other cloud computing nodes 30 assigned to that same, well-represented zone 42 may not be desirable candidates. In other words, because the zonal constraint 94 is already satisfied, adding another cloud computing node 30 associated with the same, well-represented zone 42 may be identified or categorized as a bad or an undesirable candidate node 30. Indeed, if multiple, undesirable candidate nodes 30 are all assigned to the same, well-represented zone 42, then the nodal work assignment software application 54 may rank the multiple undesirable candidate nodes 30 according to their corresponding replication assignment skews 80. The so-called worse or least desirable candidate, in other words, may have the highest/greatest replication assignment skew 80. So, if the nodal work assignment software application 54 may only select from candidate nodes 30 affiliated with the same, well-represented zone 42, then the nodal work assignment software application 54 may select the candidate node 30 having the lowest/smallest replication assignment skew 80. Similarly, if the zone 42 associated with a candidate node 30 is not well represented or populated in the work assignments 50 (perhaps as compared to other zones), then the candidate node 30 may be a good or otherwise desirable selection for addition. Moreover, if multiple desirable candidate nodes 30 are all assigned to the same, under-represented zone 42, then the nodal work assignment software application 54 may rank the multiple desirable candidate nodes 30 according to their corresponding replication assignment skews 80. The so-called best or most desirable candidate, in other words, may have the lowest/smallest replication assignment skew 80. So, if the nodal work assignment software application 54 may only select from candidate nodes 30 affiliated with the same, under-represented zone 42, then the nodal work assignment software application 54 may select the candidate node 30 having the least replication assignment skew 80.

The nodal work assignment software application 54 may thus modify the existing/older/current version 62 of the work assignments 50. The nodal work assignment software application 54, by executing the logical rule(s) 70, instructs the work assignment server 52 to inspect the existing/older/current version 62 of the work assignments 50 and to determine the relationship between C to R. If C<R, then the nodal work assignment software application 54 may improve the existing/older/current version 62 of the work assignments 50 by increasing C. That is, the nodal work assignment software application 54 generates the new version 60 of the work assignments 50 by adding the candidate cloud computing node(s) 30 to increase C. Similarly, if C>R, then the nodal work assignment software application 54 may also modify and improve the existing/older/current version 62 of the work assignments 50 by decreasing C. The nodal work assignment software application 54 generates the new version 60 of the work assignments 50 by removing work assignments 50 to decrease C. The nodal work assignment software application 54 may select the candidate cloud computing nodes 30 for addition or subtraction by determining and by comparing their respective replication assignment skews 80 while perhaps still satisfying the regional/zonal/clusteral constraints 94. The so-called best candidate nodes 30 (e.g., lowest replication assignment skews 80) may be added, and the so-called worst nodes 30 (e.g., highest replication assignment skew 80) may be removed. Moreover, any currently-assigned cloud computing nodes 30 may also be replaced according to the replication assignment skews 80 and the regional/zonal/clusteral constraints 94. The nodal work assignment software application 54 thus modifies and improves the existing/older/current version 62 by generating the new version 60 of the work assignments 50 that satisfies C=R according to the replication assignment skews 80 and the regional/zonal/clusteral constraints 94.

Figure 6:
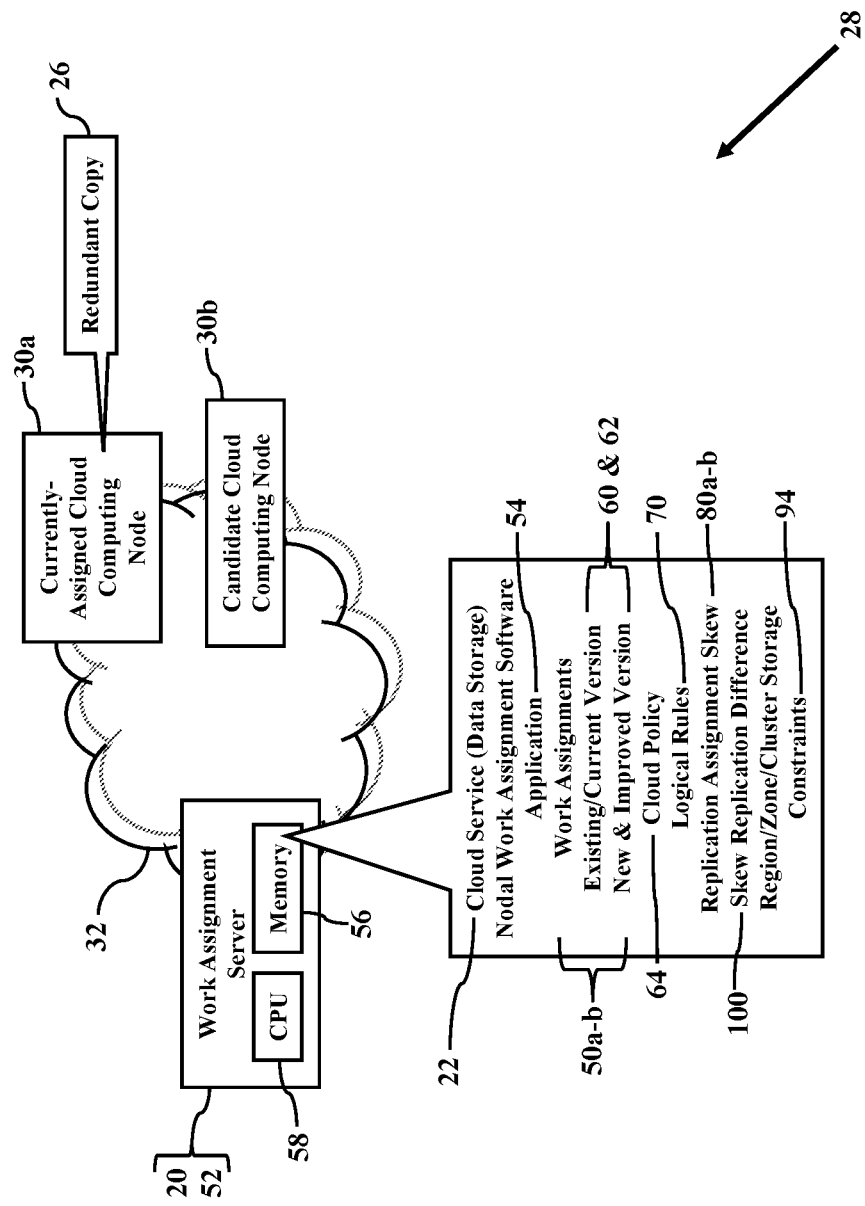
FIG. 6 illustrates examples of still more assignment improvements.

FIG. 6 illustrates examples of still more assignment improvements. The nodal work assignment software application 54 may modify and improve the existing/older/current version 62 by analyzing each individual work assignment 50. The nodal work assignment software application 54 instructs the work assignment server 52 to inspect or read an individual work assignment 50 associated with a currently-assigned cloud computing node (illustrated as reference numeral 30a). The nodal work assignment software application 54 executes the logical rule 70 that instructs the work assignment server 52 to determine the replication assignment skew 80a that corresponds to that same currently-assigned cloud computing node 30a. The nodal work assignment software application 54 instructs the work assignment server 52 to similarly determine the replication assignment skew 80b that corresponds to any or all other candidate cloud computing nodes (such as reference numeral 30b). The work assignment server 52 then compares the corresponding replication assignment skews 80a-b. The work assignment server 52, for example, compares the replication assignment skew 80a, that corresponds to the currently-assigned cloud computing node 30a, with the candidate replication assignment skew 80b that corresponds to the candidate cloud computing node 30b. The work assignment server 52 picks or selects the candidate cloud computing node 30b based on a skew replication difference 100 between the two host nodes 30a-b the most, while not degrading the regional/zonal/clusteral constraints 94. The nodal work assignment software application 54 may continue repeating this skew comparison and replacement with every candidate cloud computing node 30. The nodal work assignment software application 54 may stop hunting and replacing when no swap remains that would further reduce the skew replication difference 100 between the two involved nodes 30, without degrading the regional/zonal/clusteral constraints 94. The nodal work assignment software application 54 may thus modify and improve the existing/older/current version 62 by executing the logical rule(s) 70 to generate the new version 60 of the work assignments 50. The new version 60 of the work assignments 50 replaces and reassigns any current work assignment 50a with a replacement work assignment 50b that reduces or minimizes the skew replication difference 100 and that still satisfies the regional/zonal/clusteral constraints 94.

The skew replication difference 100 may have any measure or reference point. The work assignment server 52, as an example, may pick or select the candidate cloud computing node 30 based on a maximum value associated with the skew replication difference 100. The goal, for example, may be to produce work assignments 50 where every cloud computing node 30 is assigned exactly the ideal number of times, or as close as possible (perhaps within a threshold value). Each host node 30, for example, may be associated with a target work assignment value. Each host node 30 may also be associated with threshold+/−range of work assignments within or about the target work assignment value (such as how many work assignments is too many above the target or too few below the target). Assume, for example, there are five (5) host nodes 30, and the corresponding skew replication differences 100 are [−1, 2, 4, −2, −3]. The goal might be that the sum of adding these numbers together (turning the negative numbers to positive when doing addition) should be as small as possible. When replacing a host node 30, one (1) may be added to the host node 30 being inserted, and one (1) may be subtracted from the host node 30 being removed. As a further example, assume the host node 30 has twice the work assignments 50 as its corresponding target work assignment value. As the nodal work assignment software application 54 evaluates alternative candidate nodes 30, the nodal work assignment software application 54 may select the best candidate node 30 having the skew replication difference 100 as negative/small as possible, since that means that candidate host node 30 is underrepresented or underworked. So, when evaluating the skew replication differences [−1, 2, 4, −2, −3], the nodal work assignment software application 54 may check if the overworked cloud computing node 30 may be replaced with the candidate node 30 assigned three (3) times too few in the skew replication differences (e.g., −3), without degrading zoning. If picking that underworked candidate node 30 would degrade zoning, the nodal work assignment software application 54 may check the next two times underworked candidate node 30 (e.g., −2) and so on. So when picking a candidate node 30 for replacement, the nodal work assignment software application 54 may try to maximize the skew replication difference 100 between the overworked node 30 being removed and the underworked candidate node 30 being added, in order to minimize the skew differences in the work assignments 50 as a whole.

Figure 7:
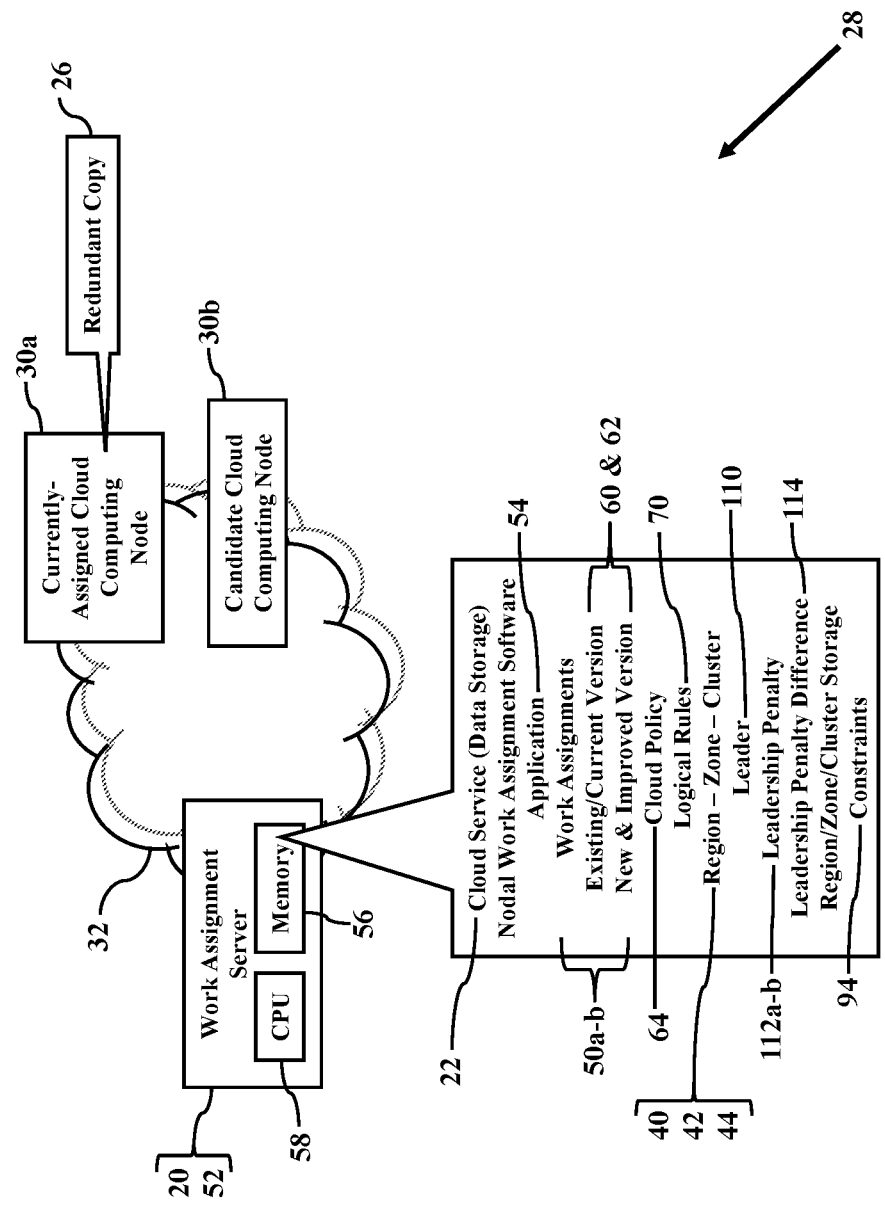
FIG. 7 illustrates examples of leadership balancing.

FIG. 7 illustrates examples of leadership balancing. Because the existing/older/current version 62 of the work assignments 50 may be specified by the region 40, zone 42, and/or cluster 46, one or more of the cloud computing nodes 30 may be designated as a manager or leader 110. A cluster leader 110, for example, may cooperate with a software agent installed to the cloud computing nodes 30 assigned to the same cluster 46. The cluster leader 110 configures and manages the cloud service 22 provided by the cloud computing nodes 30 assigned to the cluster 46. The cluster leader 110, in particular, interfaces with the work assignment server 52 to assign the work assignments 50 and/or to dispatch the work to provide the cloud service 22. The cluster leader 110 may also collect and/or assemble work results performed by the cluster 46. Leaders 110 may also be similarly assigned by the region 40 and/or by the zone 42.

Leadership may be balanced. The existing/older/current version 62 of the work assignments 50 may specify at least one leader 110. The leader 110 may be assigned according to the region 40, zone 42, and/or cluster 46. Leadership roles may thus be dispersed or distributed within the work assignments 50, with perhaps multiple different leaders 110 assigned according to the region 40, zone 42, and/or cluster 46. The nodal work assignment software application 54 may thus modify and improve the existing/older/current version 62 by generating the new version 60 of the work assignments 50 that balances leadership assignments among the cloud computing nodes 30. The nodal work assignment software application 54, for example, may assign a leadership penalty 112 to any cloud computing node 30. The leadership penalty 112 may be based on how many times the corresponding cloud computing node 30 appears as the leader 110 in the work assignments 50. The nodal work assignment software application 54 instructs the work assignment server 52 to calculate and determine the leadership penalty 112 that corresponds to any currently-assigned nodal leader 30a/110a designated by the work assignments 50. The nodal work assignment software application 54 instructs the work assignment server 52 to calculate and determine the leadership penalty 112b that corresponds to any or all other candidate cloud computing node(s) 30b. The work assignment server 52 then compares the leadership penalties 112a-b. The work assignment server 52 picks or selects the final regional/zonal/clusteral leader 110 based on a leadership penalty difference 114 between the two host nodes 30a and 30b, while not still degrading the regional/zonal/clusteral constraints 94. The nodal work assignment software application 54 may continue repeating this leadership penalty comparison and leadership replacement with any or every candidate cloud computing node 30. The nodal work assignment software application 54 may stop balancing leadership when no swap remains that would further reduce the leadership penalty difference 114 between the two involved nodes 30, without degrading the regional/zonal/clusteral constraints 94. The nodal work assignment software application 54 may thus modify and improve the existing/older/current version 62 by generating the new version 60 of the work assignments 50 that replaces and reassigns any current leadership with a replacement leadership that reduces or minimizes the leadership penalty difference 114 and that still satisfies the regional/zonal/clusteral constraints 94.

The leadership penalty difference 114 may have any measure or reference point. The work assignment server 52, as an example, may pick or select the leader 110 based on a maximum value associated with the leadership penalty difference 114. When picking a candidate leader node 30, the nodal work assignment software application 54 may want to maximize the leadership penalty difference 114 between the currently-assigned leader 110 and a candidate leader 110. Any replacement leadership may minimize the leadership penalty difference 114 the two nodes have afterwards. For example, suppose the currently-assigned leader 110a has the leadership penalty 112a of value one (1). Suppose further that a first candidate leader 110b has the leadership penalty 112b of value negative one (−1), while an alternative or second candidate leader 110c has the leadership penalty 112c of (−0.5). If the goal is to minimize the sum of (absolute) penalties, the nodal work assignment software application 54 should pick the candidate node 30b with the leadership penalty 112b of (−1), as that candidate node 30b makes the absolute sum of the leadership penalties 112 to be (0.5) (e.g., 0+0+0.5=0.5). In other words, picking the candidate node 30c with the leadership penalty 112c of (−0.5) would generate a greater sum of (1.5) (e.g., 0+1+0.5=1.5).

Work assignments are thus elegantly optimized. The nodal work assignment software application 54 is given the existing/older/current version 62 of the work assignments 50 as inputs. The nodal work assignment software application 54 analyzes, scrutinizes, and improves the existing/older/current version 62 by executing the logical rule 70 and by generating the new version 60 of the work assignments 50. The nodal work assignment software application 54 executes the logical rules representing R, C, the replication assignment skews 80, and/or the regional/zonal/clusteral constraints 94. The nodal work assignment software application 54 generates the new version 60 of the work assignments 50 by optimizing R, C, the replication assignment skews 80, and/or the regional/zonal/clusteral constraints 94. The nodal work assignment software application 54 thus performs incremental modifications to the existing/older/current version 62, which minimizes unnecessary changes to the work assignments 50. As a simple example, when a new cloud computing node 30 newly appears online and becomes available for a work assignment 50, this newly-appearing node 30 need not force or create substantial changes to the work assignments 50. The nodal work assignment software application 54, instead, may re-evaluate R, C, the replication assignment skews 80, and/or the regional/zonal/clusteral constraints 94 to merely implement slight modifications to the work assignments 50. The nodal work assignment software application 54 optimizes for zoning, for host distribution, and for leadership distribution, perhaps in that order.

Computer functioning is greatly improved. The cloud service 22 maintains the redundant copies 26 of the electronic data 24. Each redundant copy 26, though, may be preferably stored in a separate hardware device (such different ones of the cloud computing nodes 30). Managing and transferring the redundant copies 26, though, consumes great hardware, software, and networking resources. As the cloud computing nodes 30 appear online and disappear offline, for example, the redundant copies 26 must be transferred among the cloud computing nodes 30. Conventional data storage schemes, however, overly transfer the redundant copies among the cloud computing nodes 30, Indeed, some or even many of these transfers are unnecessary and thus burden the cloud computing nodes 30 with unnecessary packet traffic, unnecessary read/write operations, unnecessary electrical power consumption, and unnecessary heat generation. Conventional data storage schemes thus unnecessarily reduce hardware life. Because the conventional data storage schemes unnecessarily transfer the redundant copies 26 among the cloud computing nodes 30, network communications are bogged down and slowed and regional/zonal/clusteral performance is degraded. The nodal work assignment software application 54, in contradistinction, eschews wholesale changes to the work assignments 50. The nodal work assignment software application 54 elegantly avoids transferring the redundant copies 26 that did not need to move in order to achieve R=C. The nodal work assignment software application 54 may merely execute the simply-coded logical rules 70 to incrementally improve the existing/older/current version 62 of the work assignments 50, perhaps as a feedback mechanism. The nodal work assignment software application 54 executes the simple logical rules 70 representing R, C, the replication assignment skews 80, and/or the regional/zonal/clusteral constraints 94. The nodal work assignment software application 54 thus generates the new version 60 of the work assignments 50 by optimizing R, C, the replication assignment skews 80, and/or the regional/zonal/clusteral constraints 94. The nodal work assignment software application 54 may thus perform incremental feedback modifications, which minimizes read/write operations, electrical power consumption, heat generation, and network traffic. The nodal work assignment software application 54 generates optimizations to the existing work assignments 50, which greatly improve computer functioning and network performance.

Figure 8:
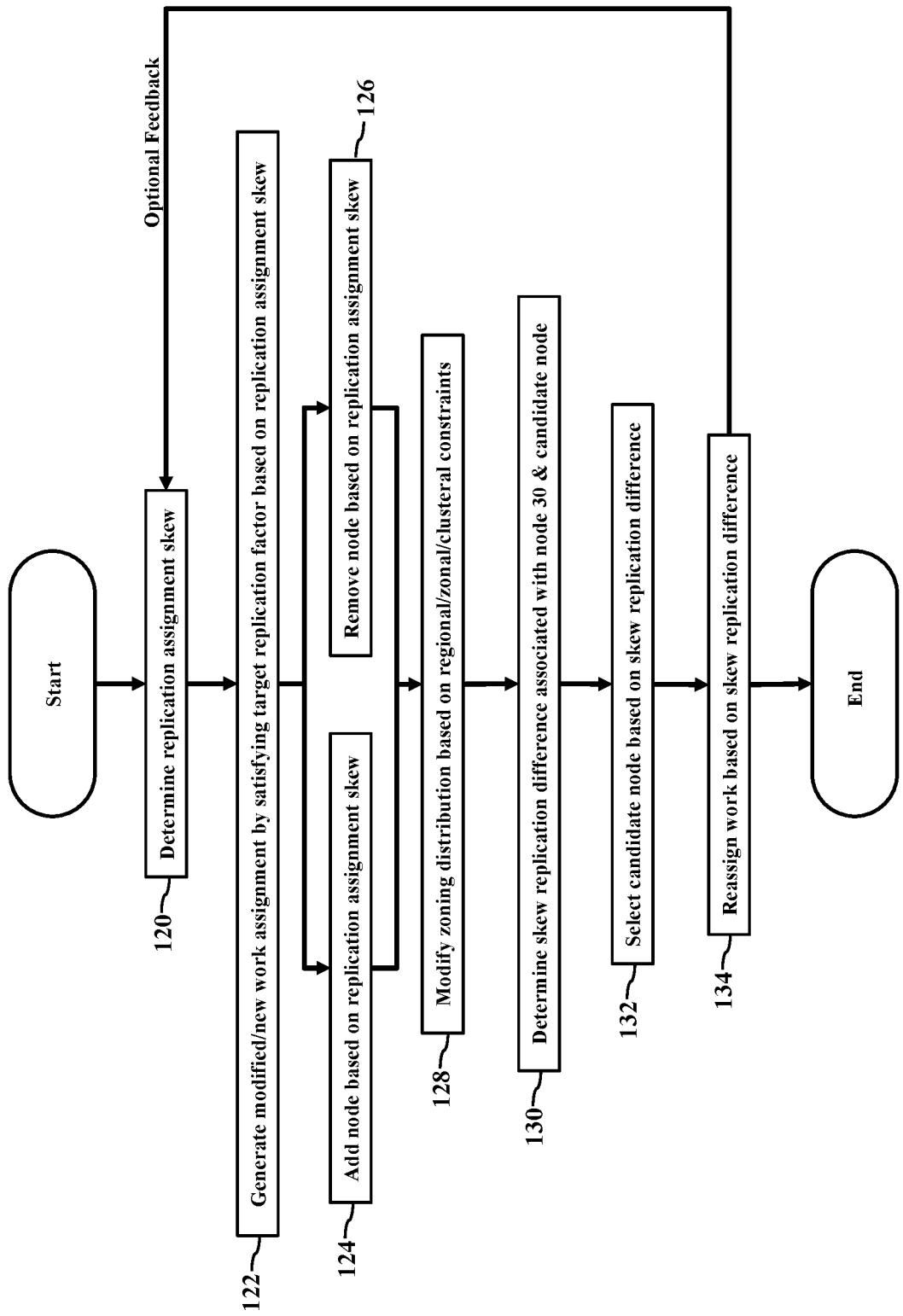
FIG. 8 illustrates more examples of operations or methods that assign work among cloud computing nodes associated with a cluster.

FIG. 8 illustrates more examples of operations or methods that assign work among the cloud computing nodes 30 associated with the cluster 44. The computer system 20 determines the replication assignment skew 80 that corresponds to a node of the nodes 30 associated with the cluster 44 providing the cloud service 22 (Block 120). The computer system 20 generates the modified/new work assignment 50 that assigns the work by satisfying the target replication factor 72 based on the replication assignment skew 80 (Block 122). The computer system 20 may add the node 30 to the modified/new work assignment 50 based on the replication assignment skew 80 (Block 124). The computer system 20 may remove the node 30 from the modified/new work assignment 50 based on the replication assignment skew 80 (Block 126). The computer system 20 may further modify a zoning distribution based on regional/zonal/clusteral constraints 94 associated with the data storage service (Block 128). The computer system 20 may determine the skew replication difference 100 associated with the node 30 and the candidate node 30 associated with the cluster 44 (Block 130). The computer system 20 may select the candidate node 30 based on the skew replication difference 100 (Block 132). The computer system 20 may reassign the work based on the skew replication difference 100 (Block 134). The latest or current work assignment(s) 50 may optionally be input as feedback for continued refinement (e.g., Block 120).

Figure 9:
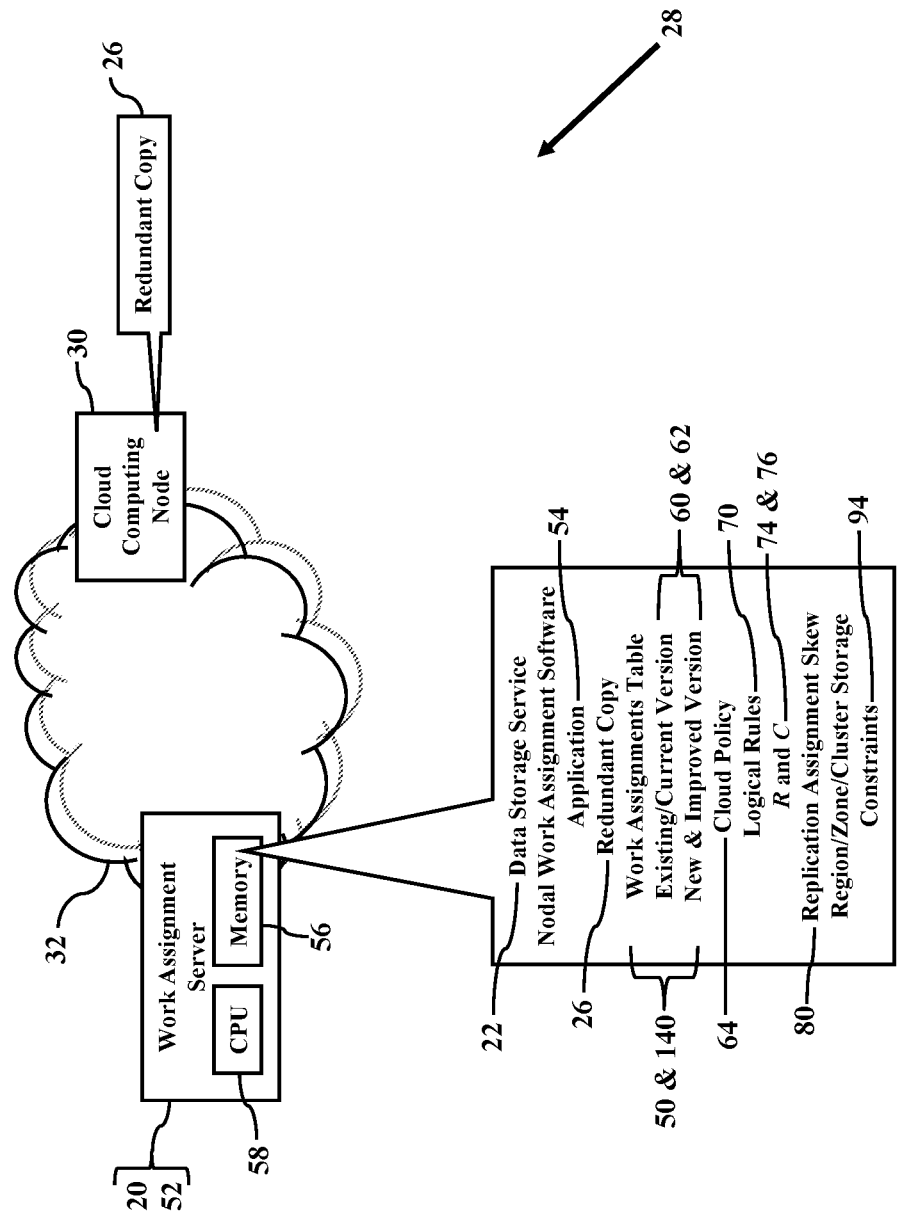
FIGS. 9-10 illustrate examples of tabular implementations.
Figure 10:
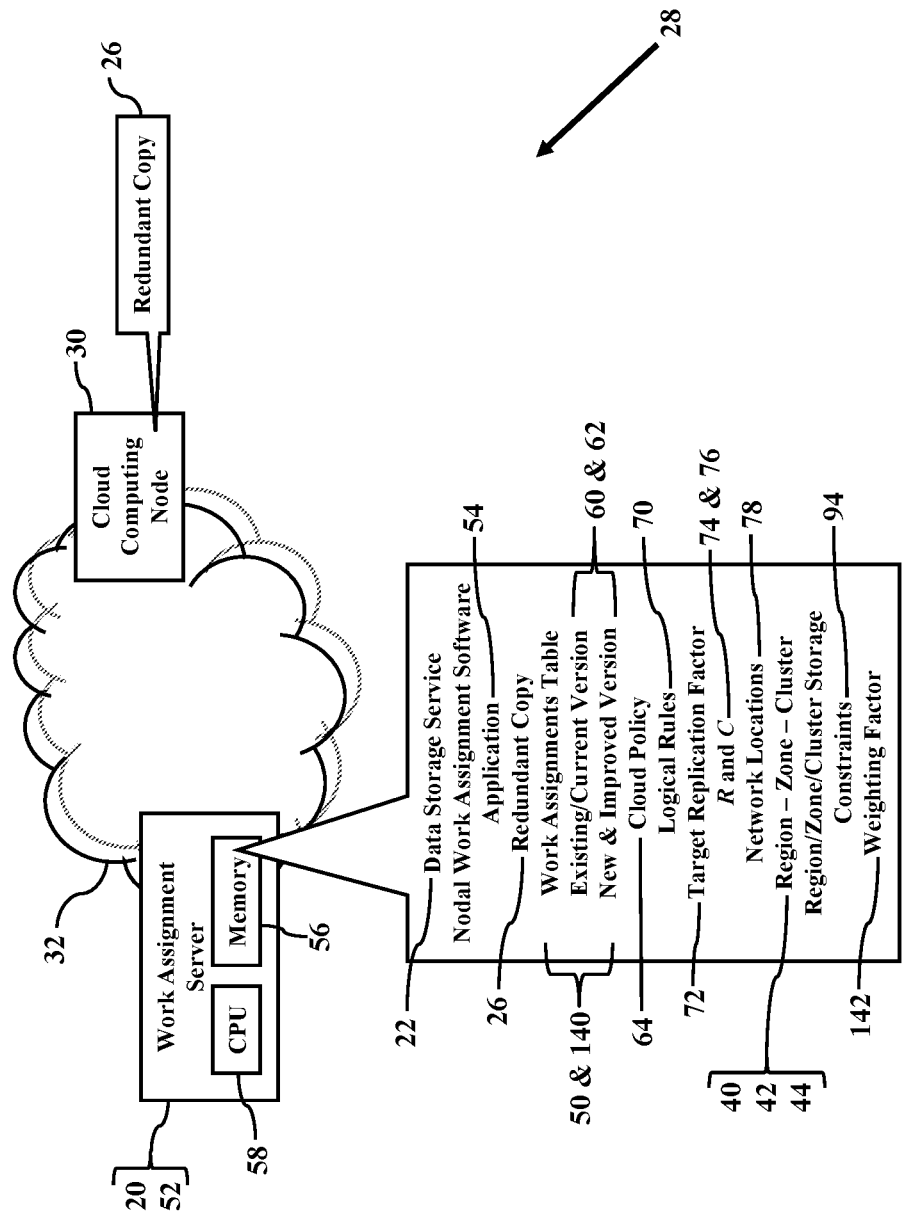

FIGS. 9-10 illustrate examples of tabular implementations. The computer system 20 (again illustrated as the work assignment server 52) receives and improves the existing/older/current version 62 of the work assignments 50. While the work assignments 50 may have any structure and formatting. FIG. 9 illustrates a work assignments table 140 that represents the work assignments 50. The work assignments table 140 may thus have columnar and row entries that map, relate, or otherwise associate each cloud computing node 30 to its corresponding work assignment 50. While the nodal work assignment software application 54 may optimize any work assignments table 140, FIGS. 9-10 illustrate examples of the cloud-based data storage service 22. Each cloud computing node 30 that participates in the data storage service 22, for example, performs the work or tasks that store or host a different one of the redundant copies 26 of the electronic data 24 (illustrated in FIG. 1). The nodal work assignment software application 54 accepts the existing/older/current version 62 of the work assignments table 140 and generates the new version 60 of the work assignments table 140 by executing the logical rules 70 involving R and C (illustrated as reference numerals 74 and 76), the replication assignment skews 80, and/or the regional/zonal/clusteral constraints 94. The nodal work assignment software application 54 thus generates the new version 60 of the work assignments table 140 by optimizing R, C, the replication assignment skews 80, and/or the regional/zonal/clusteral constraints 94. The nodal work assignment software application 54 may thus make incremental changes to the existing/older/current version 62 of the work assignments table 140. The nodal work assignment software application 54 generates the new version 60 of the work assignments table 140 to improve zoning and host distribution.

As FIG. 10 illustrates, the nodal work assignment software application 54 is given the existing/older/current version 62 of the work assignments table 140 as an input. The existing/older/current version 62 of the work assignments table 140 may even have empty or undefined columnar/row entries. The nodal work assignment software application 54 also obtains or retrieves the target replication factor 72 defining or specifying the required number of the R redundant copies (illustrated as reference numeral 74), the currently-stored number C of the redundant copies (illustrated as reference numeral 76), and perhaps their corresponding network locations 78 (e.g., the region 40, zone 42, and/or cluster 44) associated with each currently-existing redundant copy 26. The nodal work assignment software application 54 also obtains or retrieves the regional/zonal/clusteral constraints 94 (such as, for example, how many of the redundant copies R must be stored according to the region 40, zone 42, and/or cluster 44). The nodal work assignment software application 54 may also obtain or retrieve any weighting factor(s) 142 that is/are associated with each cloud computing node 30. Any of the target replication factor 72, the network locations 78, the regional/zonal/clusteral constraints 94, and/or the weighting factors 142 may be inputs to the nodal work assignment software application 54. The target replication factor 72, the network locations 78, the regional/zonal/clusteral constraints 94, and/or the weighting factors 142, for example, may be specified by the cloud policy 64 established/distributed by the cloud computing network 28. The nodal work assignment software application 54 generates and outputs the new version 60 of the work assignments table 140 that is perhaps as much as possible like the original existing/older/current version 62, while achieving the target replication factor 72 and balancing the regional/zonal/clusteral constraints 94 and the weighting factors 142 as well as possible. The nodal work assignment software application 54 may thus receive the original existing/older/current version 62 as feedback input and generate the new version 60 of the work assignments table 140 by executing the logical rules 70.

Figure 11:
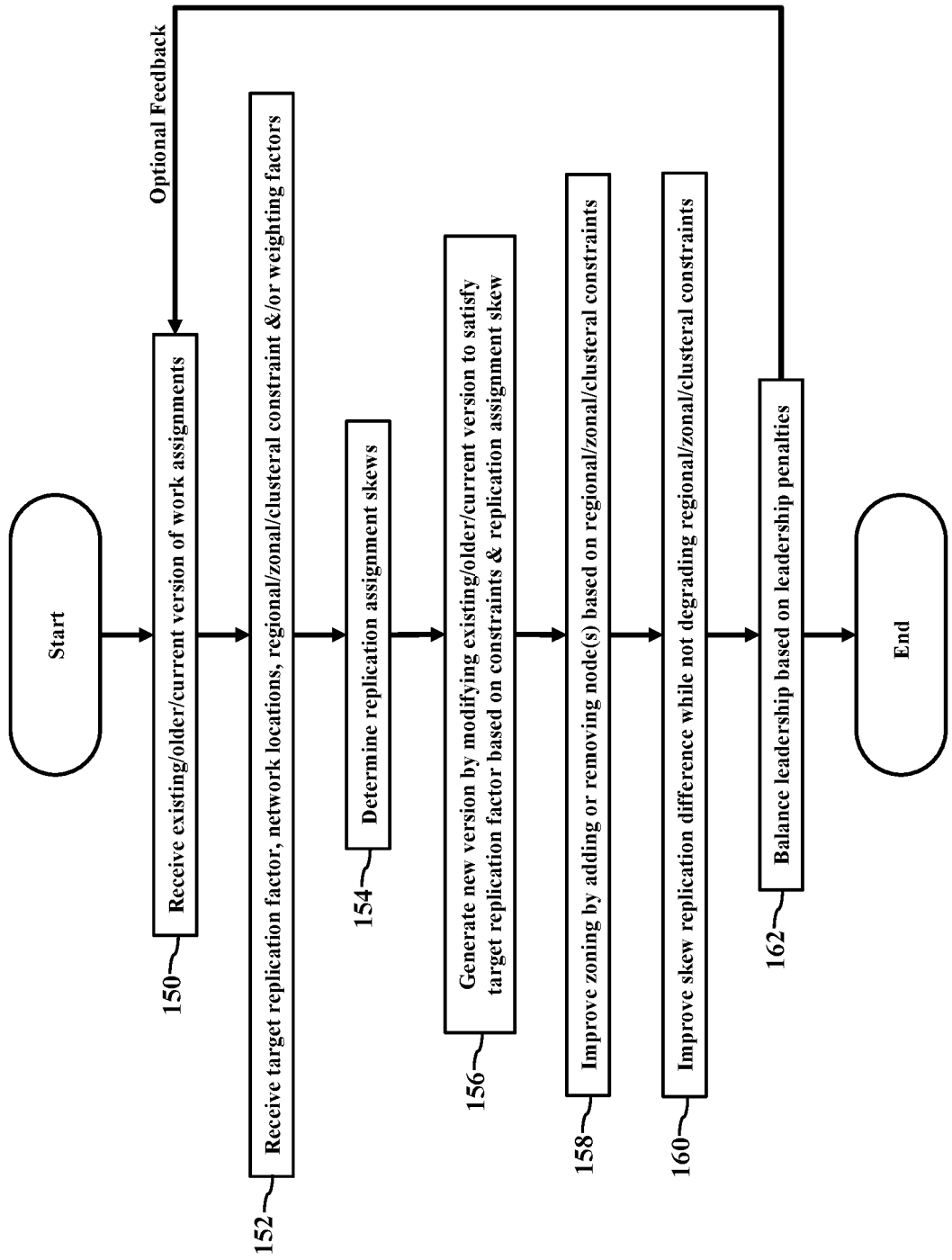
FIG. 11 illustrates more examples of operations or methods that manage redundant copies of electronic data.

FIG. 11 illustrates more examples of operations or methods that manage the redundant copies 26 of the electronic data 24. The cloud computing node 30 (such as the computer system 20) receives the existing/older/current version 62 of the work assignments 50 (Block 150). The computer system 20 also receives the target replication factor 72, the network locations 78, the regional/zonal/clusteral constraints 94, and/or the weighting factors 142 defined or specified by the cloud computing network 28 (Block 152). Because the existing/older/current version 62 of the work assignments 50 lists the cloud computing nodes 30 hosting the cloud service 22 (and perhaps their corresponding weighting factors 142), the computer system 20 executes the nodal work assignment software application 54 and generates the replication assignment skews 80 associated with the cloud computing nodes 30 hosting, participating in, or assigned to, the cloud service 22 (Block 154). That is, given the list of host nodes 30, the nodal work assignment software application 54 calculates the ideal or target number of times each host node 30 should appear in the work assignments 50, perhaps disregarding the regional/zonal/clusteral constraints 94. Each replication assignment skew 80 may thus be the difference between how many times the corresponding host actually appears in the work assignments table 140, and how many times the corresponding host would appear ideally.

The computer system 20 generates the new version 60 of the work assignments table 140 by satisfying the target replication factor 72 (Block 156). For each row in the work assignments table 140, the nodal work assignment software application 54 removes or adds enough participating cloud computing nodes 30 to hit/achieve the target replication factor 72. When deciding which cloud computing node 30 to add or remove, the nodal work assignment software application 54 selects the candidate node(s) 30 based on the regional/zonal/clusteral constraints 94 and the replication assignment skew 80. The nodal work assignment software application 54 may thus satisfy the target replication factor 72 for any row by either repeatedly adding the best or most-desirable candidate nodes 30 or by removing the worst or least-desirable candidate nodes 30. At this point, then, the nodal work assignment software application 54 has generated the new version 60 of the work assignments table 140 with the target replication factor 72 satisfied.

Zoning distribution is improved (Block 158). The nodal work assignment software application 54 inspects and scrutinizes each work assignment 50 in the new version 60 of the work assignments 50. The nodal work assignment software application 54 may improve zoning distribution using the same definition/measure of best and worst candidate nodes 30 as above disclosed. The nodal work assignment software application 54 inspects any work assignment 50 replaces the worst node 30 with the best candidate node 30 according to the regional/zonal/clusteral constraints 94. The nodal work assignment software application 54 has thus further refined the new version 60 of the work assignments 50 by improving zonal distribution.

The skew replication difference 100 is improved (Block 160). For each work assignment 50, the nodal work assignment software application 54 calculates all possible replacements of host nodes 30 for that same work assignment 50. The nodal work assignment software application 54 picks or selects the replacement host node 30 based on the skew replication difference 100 between the two host nodes 30 (as previously explained), while not degrading the regional/zonal/clusteral constraints 94. Once the candidate host node 30 is determined, the nodal work assignment software application 54 then replaces or swaps the nodal work assignments 50. This swapping/replacement procedure may be repeatedly performed until no swap will further improve the skew replication difference 100 between the two involved nodes, without degrading the regional/zonal/clusteral constraints 94. The nodal work assignment software application 54 has thus further refined the new version 60 of the work assignments 50 by optimizing for the skew replication difference 100.

Leadership is improved (Block 162). As the nodal work assignment software application 54 reads the work assignments 50, at least one work assignment 50 may specify an indication of the leadership 110. One or more of the cloud computing nodes 30, in this example, may be designated as the manager or leader 110. In this example, then, the nodal work assignment software application 54 may balance leadership among the host nodes 30. Every cloud computing node 30 may be assigned the leadership penalty 112 based on how many times the host node 30 appears as the leader 110 in the new version 60 of the work assignments 50. The nodal work assignment software application 54 calculates every possible swap between the manager or leader 110 and other candidate nodes 30. The nodal work assignment software application 54 performs the swap that most improves the leadership penalty difference 114 between the two involved nodes 30. The nodal work assignment software application 54 repeats this comparison of the leadership penalties 112 until no swap can be performed that would further reduce the leadership penalty difference 114 between the two involved nodes 30. The nodal work assignment software application 54 has thus further refined the new version 60 of the work assignments 50 by balancing for the nodal leadership. The newly-modified version 60 of the work assignments table 140 may optionally be input as feedback for continued refinement (e.g., Block 150).

FIGS. 12A-12B illustrate more examples of tabular rules 70. The nodal work assignment software application (illustrated as reference numeral 54 in FIGS. 1-9) executes the logical rules 70 that modify the existing/older/current version 62 of the work assignments table 140 to generate the new version 60 of the work assignments table 140. FIG. 12A, for example, illustrates a very simple example of the existing/older/current version 62 of the work assignments table 140. The data storage service (illustrated as reference numeral 22 in FIGS. 1-9), in actual practice, may have hundreds or even thousands of the cloud computing nodes (illustrated as reference numeral 30 in FIGS. 1-9). Such a large work assignments table 140 is far too difficult to illustrate. FIG. 12A thus illustrates a simple (2×3) work assignments table 140 (e.g., 2 rows and 3 columns) listing or representing four (4) different host nodes 30 (e.g., 0, 1, 2, 3). The nodal work assignment software application 54 may first execute one or more logical rules 70 that remove ineligible nodes 30. That is, some cloud computing nodes 30 may be ineligible to participate in the cloud service 22. While service ineligibility may have any reason or cause, let's assume that node #3 is offline and therefore unavailable and ineligible. FIG. 12B thus illustrates the new version 60 of the work assignments table 140 having the ineligible node 3 removed.

FIGS. 13A-13B illustrate more examples of redundancy tabular rules 70. The nodal work assignment software application (illustrated as reference numeral 54 in FIGS. 1-9) may also execute one or more logical rules 70 that reduce the current count C of the redundant copies (illustrated as reference numerals 76 and 26 in FIGS. 1-9). The logical rule(s) 70 is/are given a target table width, and the rule(s) 70 reduce any tabular rows above that width to the target. The nodal work assignment software application (illustrated as reference numeral 54 in FIGS. 1-9) may do so by repeatedly removing the worst or most undesirable node(s) 30 in terms of zoning (e.g., the regional/zonal/clusteral constraints 94) and/or in terms of the replication assignment skew 80. For simplicity, FIGS. 13A-13B only illustrate a simple update of a single row 170 within the work assignments table 140. Again, though, in actual practice the work assignments table 140 may have many rows assigning the server work to hundreds or even thousands of the cloud computing nodes 30. Assume also the work assignments table 140 has other rows yielding the described replication assignment skews 80. For example, suppose that these host nodes 30 are assigned to, or located within, these zones 42:

Zone 1; 0 and 1;
Zone 2; 2 and 3; and
Zone 3; 4.

Suppose also that the nodal work assignment software application 54 calculates the following replication assignment skews 80:

Host 0; 1;
Host 1; 2;
Host 2; −1;
Host 3; −2; and
Host 4; 0.

Now, assuming that the target table width is 3 columns, FIG. 13A illustrates the table row 170*a* before modification as (0, 1, 2, 3, 4). FIG. 13B, though, illustrates the table row 170*b* modified and generated by the nodal work assignment software application 54 as (0, 3, 4). Host nodes #2 & #3 were thus removed by evaluating zoning (e.g., the regional/zonal/clusteral constraints 94) and the replication assignment skew 80.

Figures 14A, 14B:
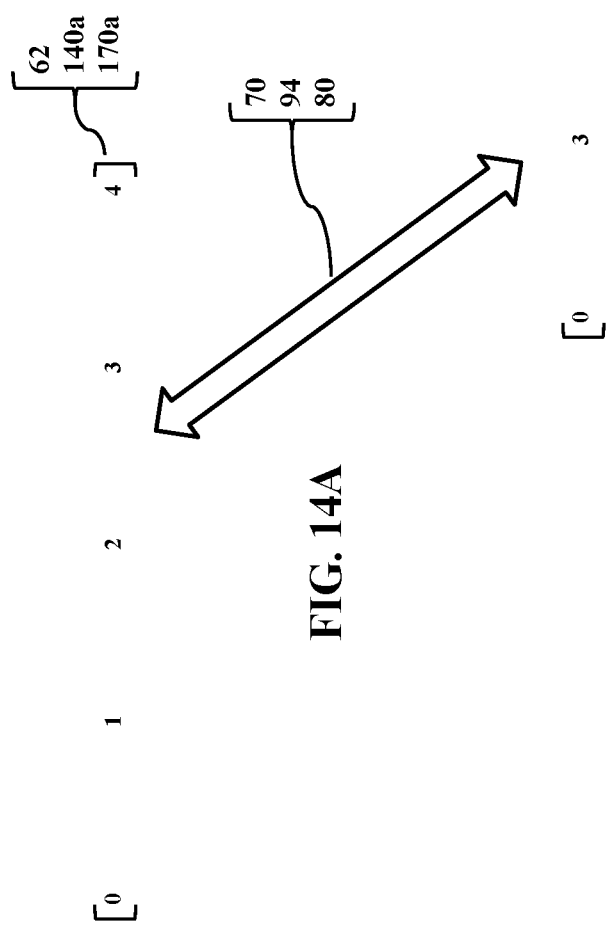

FIGS. 14A-14B illustrate still more examples of redundancy tabular rules 70. The nodal work assignment software application (illustrated as reference numeral 54 in FIGS. 1-9) may also execute one or more logical rules 70 that increase the current count C of the redundant copies (illustrated as reference numerals 76 and 26 in FIGS. 1-9). The rules 70 are given the target table width, and the rule(s) add work assignments 50 to host nodes 30 (e.g., columnar entries) to any table rows 170 narrower than the target width. The nodal work assignment software application 54 may do so by repeatedly adding the best or most desirable node(s) 30 not yet in the row 170. For simplicity, FIGS. 14A-14B only illustrate a simple update of the single row 170. Again, though, in actual practice the work assignments table 140 may have many rows assigning the work to hundreds or even thousands of cloud computing nodes 30. Assume also the work assignments table 140 has other rows yielding the described replication assignment skews 80. For example, suppose that these hosts are assigned to, or located within, these zones 42:

Zone 1; 0 and 1;
Zone 2; 2 and 3;
Zone 3; 4; and
Zone 4; 5.

Suppose also that the nodal work assignment software application 54 calculates the following replication assignment skews 80:

Host 0; 1;
Host 1; 2;
Host 2; −1;
Host 3; −2;
Host 4; 0; and
Host 5; 10.

Now, assuming that the target table width is 5, FIG. 14A illustrates the table row 170a before modification as (0, 3, 4). FIG. 14B, though, illustrates the table row 170b modified and generated by the nodal work assignment software application 54 as (0, 3, 4, 5, 2). Host nodes 2 & 2 were thus added to the row 170b by evaluating zoning (e.g., the regional/zonal/clusteral constraints 94) and the replication assignment skew 80.

Figures 15A, 15B:
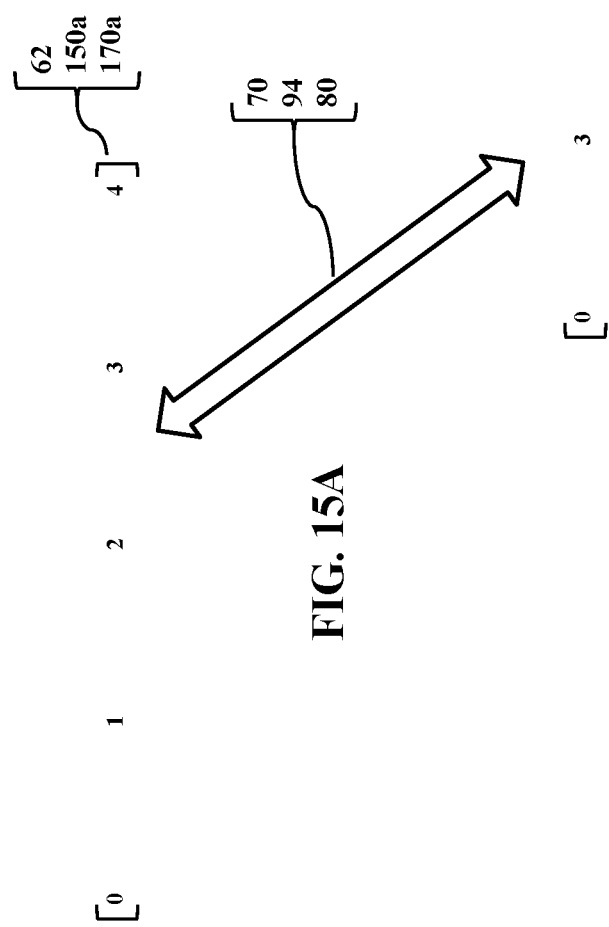

FIGS. 15A-15B illustrate still more examples of nodal replacement rules 70. The nodal work assignment software application (illustrated as reference numeral 54 in FIGS. 1-9) may also execute one or more logical rules 70 that replace one or more work assignments 50 (e.g., cloud computing nodes 30) to improve zoning. The nodal work assignment software application 54 executes the rule(s) 70 to achieve one of the best possible zoning distributions in each row 170. For example, if there are three (3) zones 42 available and five (5) hosts are needed in the row 170, then the nodal work assignment software application 54 adds two (2) hosts from two of the zones 42, and one (1) host from the last zone. The nodal work assignment software application 54 adds zonal host nodes 30 by computing how many nodes 30 need to be replaced to achieve ideal zoning, and then repeatedly removing the worst zoned node 30, and adding the best zoned node 30. For simplicity, FIGS. 15A-15B only illustrate a simple update of the single row 170. Again, though, in actual practice the work assignments table 140 may have many rows assigning the server work to hundreds or even thousands of cloud computing nodes 30. Assume also the work assignments table 140 has other rows yielding the described replication assignment skews 80. For example, suppose that these hosts are assigned to, or located within, these zones 42:

Zone 1; 0 and 1;
Zone 2; 2 and 3;
Zone 3; 4;
Zone 4; 5; and
Zone 5; 6.

Suppose also that the nodal work assignment software application 54 calculates the following replication assignment skews 80:

Host 0; 1;
Host 1; 2;
Host 2; −1;
Host 3; −2;
Host 4; 0;

Host 5; 10; and
Host 6; 15.

FIG. 15A illustrates the table row 170a before modification as (0, 1, 2, 3, 4). FIG. 15B, though, illustrates the table row 170b modified and generated by the nodal work assignment software application 54 as (0, 3, 4, 5, 6). Host nodes 1, 2, 3, and 4 were thus replaced or reassigned by evaluating zoning (e.g., the regional/zonal/clusteral constraints 94) and the replication assignment skews 80.

FIGS. 16A-16B illustrate still more examples of nodal replacement rules 70. The nodal work assignment software application (illustrated as reference numeral 54 in FIGS. 1-9) may also execute one or more logical rules 70 that replace one or more work assignments 50 (e.g., cloud computing nodes 30) to improve the replication assignment skews 80. The nodal work assignment software application 54 executes the rule(s) 70 to achieve the best possible skew distribution (i.e., skews should be as close to zero as possible), while not making zoning distribution worse than it was in the existing/older/current version 62 of the work assignments table 140. For simplicity, FIGS. 16A-16B only illustrate a simple update of three (3) rows 170. Again, though, in actual practice the work assignments table 140 may have many rows assigning the server work to hundreds or even thousands of cloud computing nodes 30. Assume also the work assignments table 140 has other rows yielding the described replication assignment skews 80. For example, suppose that these hosts are assigned to, or located within, these zones 42:

Zone 1; 0 and 1; and
Zone 2; 2 and 3.

Suppose also that the nodal work assignment software application 54 calculates the following replication assignment skews 80:

Host 0; 1;
Host 1; 2;
Host 2; −1; and
Host 3; −2,

FIG. 16A illustrates the table rows 170a before modification as (0, 1, 2), (0, 1, 2), and (0, 1, 2). FIG. 16B, though, illustrates the table rows 170b modified and generated by the nodal work assignment software application 54 as (0, 3, 2), (3, 1, 2), and (0, 1, 2). The final replication assignment skews 80 are thus:

Host 0; 0;
Host 1; 1;
Host 2; −1; and
Host 3; 0.

Note that the nodal work assignment software application 54 could not further swap or replace node #1 with node #2, so no further improvement to the replication assignment skews 80 is possible.

FIGS. 17A-17B illustrate still more examples of leadership distribution rules 70. The nodal work assignment software application (illustrated as reference numeral 54 in FIGS. 1-9) may also execute one or more logical rules 70 that swap nodal order to improve leadership distribution. The nodal work assignment software application 54 executes the logical rules 70 to reorder the host nodes 30 in each row 170 to achieve the best possible distribution of the leadership 110. Again, while the nodal work assignment software application 54 may utilize any leadership indicator or mechanism, FIGS. 17A-17B illustrate a first columnar entry 152 in each row 170 designated as the manager or leader 110 of the other row host nodes 30. Here, then, because the host nodes 30 in each row 170 are reordered, the nodal work assignment software application 54 need not, but may, consider replication assignment skews 80 and/or the regional/zonal/clusteral constraints 94. For simplicity, FIGS. 17A-17B only illustrate a simple update of three (3) rows 170, as examples having hundreds or even thousands of cloud computing nodes 30 would be too difficult to illustrate. Moreover, suppose the work assignments table 140 has these leadership penalties 112 (a node 30 has 1 penalty point per row it leads, e.g., a node 30 leading 10 rows has the leadership penalty 112 of 10):

Host 0; 4;
Host 1; 0; and
Host 2; 0.

FIG. 17A illustrates the table rows 170a before modification as (0, 1, 2), (0, 1, 2), (0, 1, 2), and (0, 1, 2). FIG. 17B, though, illustrates the table rows 170b modified and generated by the nodal work assignment software application 54 as (2, 0, 1), (1, 2, 0), (0, 1, 2), and (0, 1, 2). The final penalties may thus be:

Host 0; 2;
Host 1; 1; and
Host 2; 1.

Note that the nodal work assignment software application 54 may not further swap or replace the leadership 110, as further swaps would not reduce the difference between the leadership penalties 112.

The work assignments 50 are thus incrementally and elegantly optimized. The nodal work assignment software application 54 may be given the existing/older/current version 62 of the work assignments table 140 as feedback inputs. The nodal work assignment software application 54 analyzes, scrutinizes, and improves the existing/older/current version 62 by generating the new version 60 of the work assignments table 140. The nodal work assignment software application 54 performs incremental modifications to the existing/older/current version 62, rather than generating an entirely new table that overly changes the work assignments 50 and consumes too much work (hardware and software resources) and creates too much network traffic. The nodal work assignment software application 54 thus minimizes unnecessary changes when inputs only minorly change (such as, for example, when a new host appears). The nodal work assignment software application 54 also optimizes for good zoning in each table row 170, for good host distribution accounting for the weighting factor 142, and for distribution of the leadership 110, perhaps in that order.

The work assignments 50 are also deterministic. Because the nodal work assignment software application 54 executes the logical rules 70 to generate the new version 60 of the work assignments table 140, the nodal work assignment software application 54 may remove/eliminate randomness in the work assignments 50. The nodal work assignment software application 54 is given the existing/older/current version 62 of the work assignments table 140 as an input. The nodal work assignment software application 54 then follows the logical rules 70 describing the target replication factor 72 (perhaps specifying R, C, and their corresponding network locations 78), the regional/zonal/clusteral constraints 94, the weighting factors 142, the replication assignment skews 80, and/or the leadership penalty 112. Simply put, the new version 60 may be predicted and reproduced from the feedback current version 62. Because the nodal work assignment software application 54 is deterministic, the nodal work assignment software application 54 may make no changes to the work assignments table 140 if given its own output.

Figure 18:
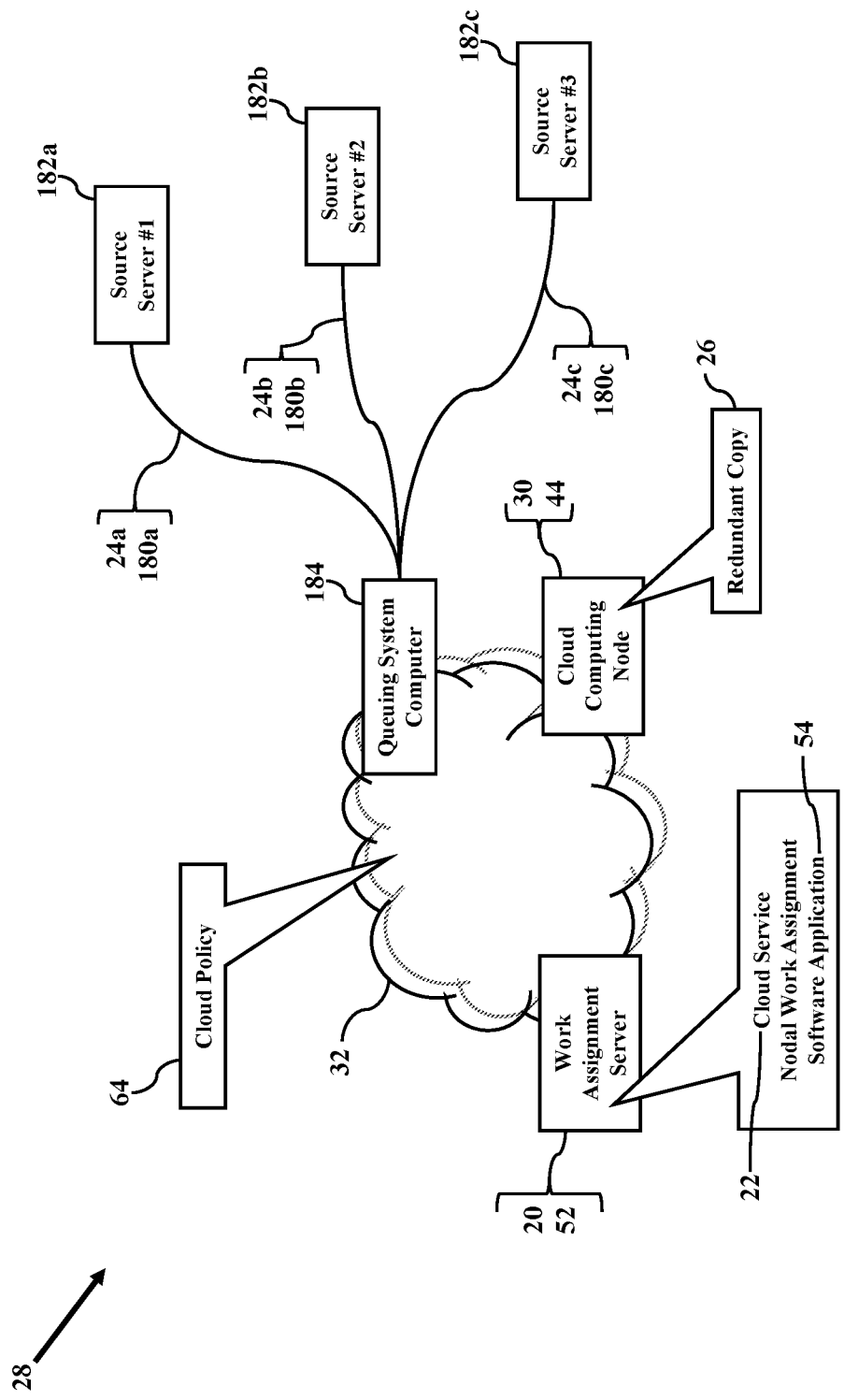
FIGS. 18-19 illustrate examples of partition queuing.
Figure 19:
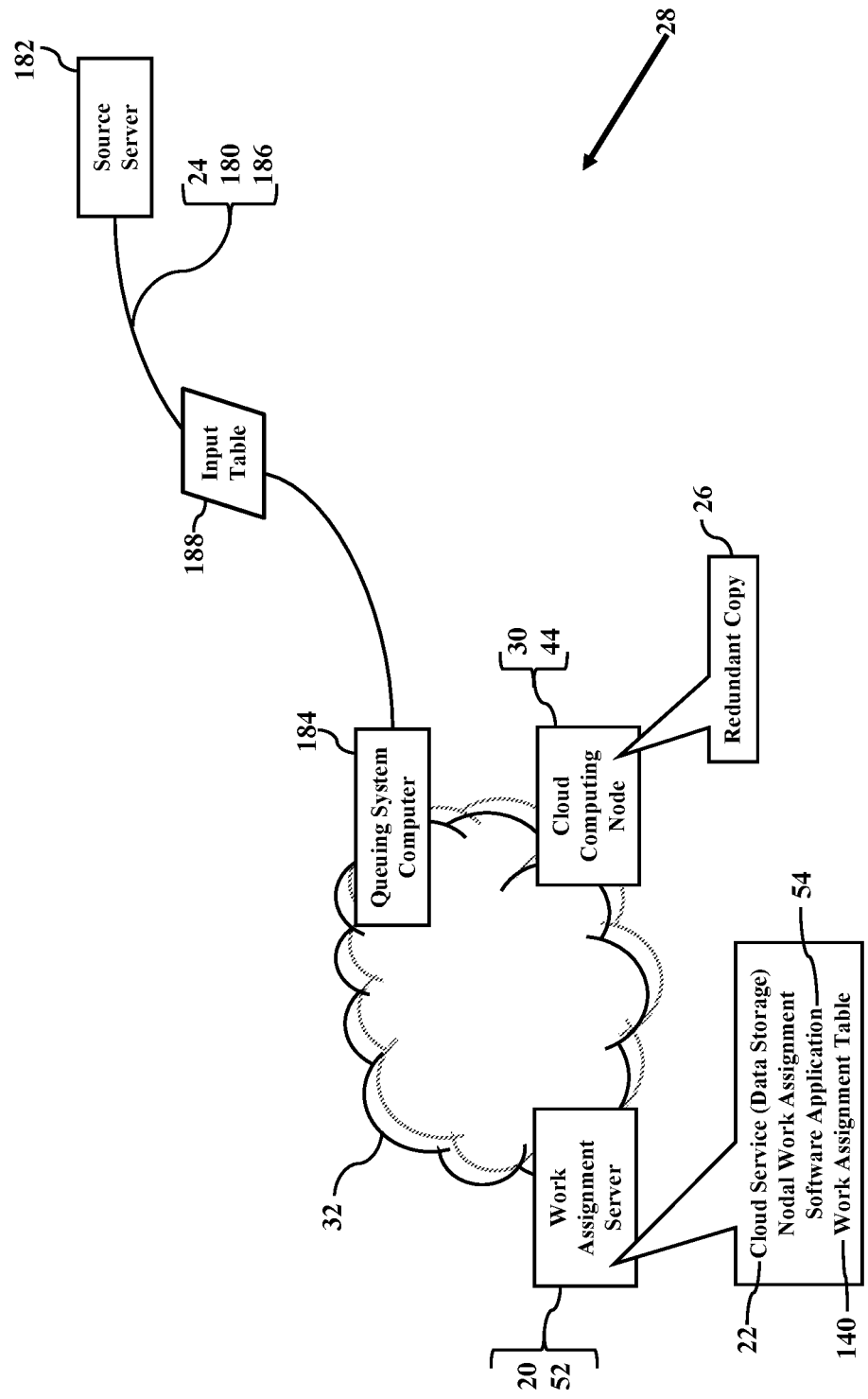

FIGS. 18-19 illustrate examples of partition queuing. The cloud service 22 may have many different input streams 180. Each input stream 180 may provide a different electronic data 24 to be replicated. Each input stream 180 may thus originate from a source server 182, and the source server 182 sends its corresponding input stream 180 to the cloud computing network 28 for the cloud service 22. The cloud service 22 and/or the cloud computing network 28 may thus have a queuing computer system 184 that receives and/or distributes the different input streams 180 from the different source servers 182. Because the different input streams 180 must be replicated according to its respective cloud service 22, the work assignment server 52 may decide which of the cloud computing nodes 30 stores the redundant copies 26 of the input streams 180. The work assignment server 52, in other words, assigns the server work operations that reads a particular one of the input streams 180 from the queuing computer system 184 and that locally stores the redundant copy 26 of that particular input stream 180. The work assignment server 52, for example, determines which of the cloud computing nodes 30, assigned to the cluster 44, reads which input stream 180 that is available from the queuing computer system 184.

As FIG. 19 illustrates, the queuing computer system 184 may even sub-divide, or partition, the input stream 180. The queuing computer system 184 may thus serve different input partitions 186 that may be independently read, and the work assignment server 52 assigns the work of reading and storing the corresponding input partition 186. The queuing computer system 184 may provide an input table 188 having rows and columns describing the number of the input streams 180 and/or the input partitions 186. The queuing computer system 184 may send the input table 188 to the cloud computing network 28 for the cloud service 22. The cloud computing network 28 may route the input table 188 to the work assignment server 52. When the work assignment server 52 receives the input table 188, the work assignment server 52 generates the work assignment table 140 that specifies which cloud computing nodes 30 perform the server work (e.g., reading/storing the redundant copies 26). The work assignment server 52, in particular, may generate the work assignment table 140 to have the same dimensional number of the input rows 170 (illustrated in FIGS. 12-17) as the input table 188. The work assignment table 140 may thus be associated with a target size (e.g., rows and/or columns) supplied as a service parameter for the cloud service 22. The number of the rows 170, for example, may correspond to the number of input rows/streams provided by the queuing computer system 184. The number of servers in each row 170 (e.g., the table width specifying the number of the cloud computing nodes 30 in each row 170) may be a configuration parameter. The number of the cloud computing nodes 30 in each row 170, for example, may be determined according to the required number R of the redundant copies 26 processed out of the queuing computer system 184 and stored in the cluster 44.

The work assignment server 52 may implement incremental assignment changes. The nodal work assignment software application 54 may only implement necessary changes to the work assignments 50. The nodal work assignment software application 54 may merely incrementally improve the existing/older/current version 62 of the work assignments 50. The nodal work assignment software application 54 thus generates the new version 60 of the work assignments 50 by optimizing R. C, the replication assignment skews 80, and/or the regional/zonal/clusteral constraints 94. The nodal work assignment software application 54 thus performs incremental modifications that optimize the existing work assignments 50. The nodal work assignment software application 54 may thus periodically, or even continually, execute to generate frequent optimizations that constantly improve the previous version 62 of the work assignments 50. The previous version 62 may thus be input as a feedback mechanism to the nodal work assignment software application 54 that continuously improves the work assignments 50. The work assignment server 52 may thus auto-apply the new version 60 of the work assignments 50 and then resubmit the new version 60 as feedback to the nodal work assignment software application 54. This continuous refinement/improvement is very attractive, especially when no changes are made, as no server work need then be done.

Computer functioning is greatly improved. Conventional cloud-based data storage schemes make too many changes to the work assignments 50. Conventional cloud-based data storage schemes unnecessarily transfer files and other data across networks, thus consuming great hardware, software, and networking resources. The nodal work assignment software application 54, in contradistinction, may only implement necessary changes to the work assignments 50. The nodal work assignment software application 54 elegantly avoids transferring the redundant copies 26 that did not need to move in order to achieve R=C. The nodal work assignment software application 54 may merely incrementally improve the existing/older/current version 62 of the work assignments 50. The nodal work assignment software application 54 thus generates the new version 60 of the work assignments 50 by optimizing R, C, the replication assignment skews 80, and/or the regional/zonal/clusteral constraints 94. The nodal work assignment software application 54 thus performs incremental modifications, which minimizes read/write operations, electrical power consumption, heat generation, and network traffic. The nodal work assignment software application 54 generates optimizations to the existing work assignments 50, which greatly improve computer functioning and network performance.

Improved computer functioning may be further illustrated. Conventional schemes merely fill a table by picking round-robin from available nodes. The below work assignment table 140 illustrates a starting layout.

[1, 2, 3]
[4, 5, 1]

If node 3 is assumed to go offline (for whatever reason), the nodal work assignment software application 54 may generate the below new and improved version 62:

[1, 2, 4]
[4, 5, 1].

Notice that the reassigned server work assignments only have to copy files owned by row 1 to host node #4. The conventional round-robin solution, however, would instead regenerate the table from scratch and arrive at

[1, 2, 4]
[5, 1, 2].

This conventional round-robin solution would thus copy the files owned by row 1 to host #4. This conventional round-robin solution, however, would also unnecessarily copy files owned by row 2 to host #2, and the conventional round-robin solution also instructs host #4 to delete its copies of files from row 2. The new and improved version 62 generated by the nodal work assignment software application 54 thus required far less server work, far less electrical power, and far less network traffic.

Eligibility may be dynamic. The eligibility of any cloud computing node 30 to provide or participate in the cloud service 22 may change with time and with content. That is, the cloud policy 64 may specify different governing rules 70 (e.g., goals, and/or parameters) according to the content (e.g., the electronic data 24 illustrated in FIGS. 1-2) being duplicated or backed up. Some customers, clients, or content may require R quadruple or more duplicate copies 26. Other customers, clients, or content may suffice with a single copy 26. So, the cloud policy 64 may specify differing R and C requirements, depending on any factors (such as the data content and customer/client requirements). The differing R and C requirements may cause dynamic changes in eligibility. The cloud policy 64 may further specify differing regional 50, zonal 52, and/or cluster 44 requirements, again perhaps depending on the data content and customer/client requirements. The differing regional 50, zonal 52, and/or cluster 44 requirements may also cause dynamic changes in eligibility, distribution, and the regional/zonal/clusteral constraints 94. Moreover, changing network locations 78 may also cause dynamic changes in eligibility. The nodal work assignment software application 54 may thus include program code that forces or causes a re-evaluation of eligibility according to periodic or random time or upon any change in content. R. C, region 40, zone 42, cluster 44, and/or network location 64. The nodal work assignment software application 54 may dynamically reassess eligibility to ensure data integrity and availability for any content and for any client/customer.

Figure 20:
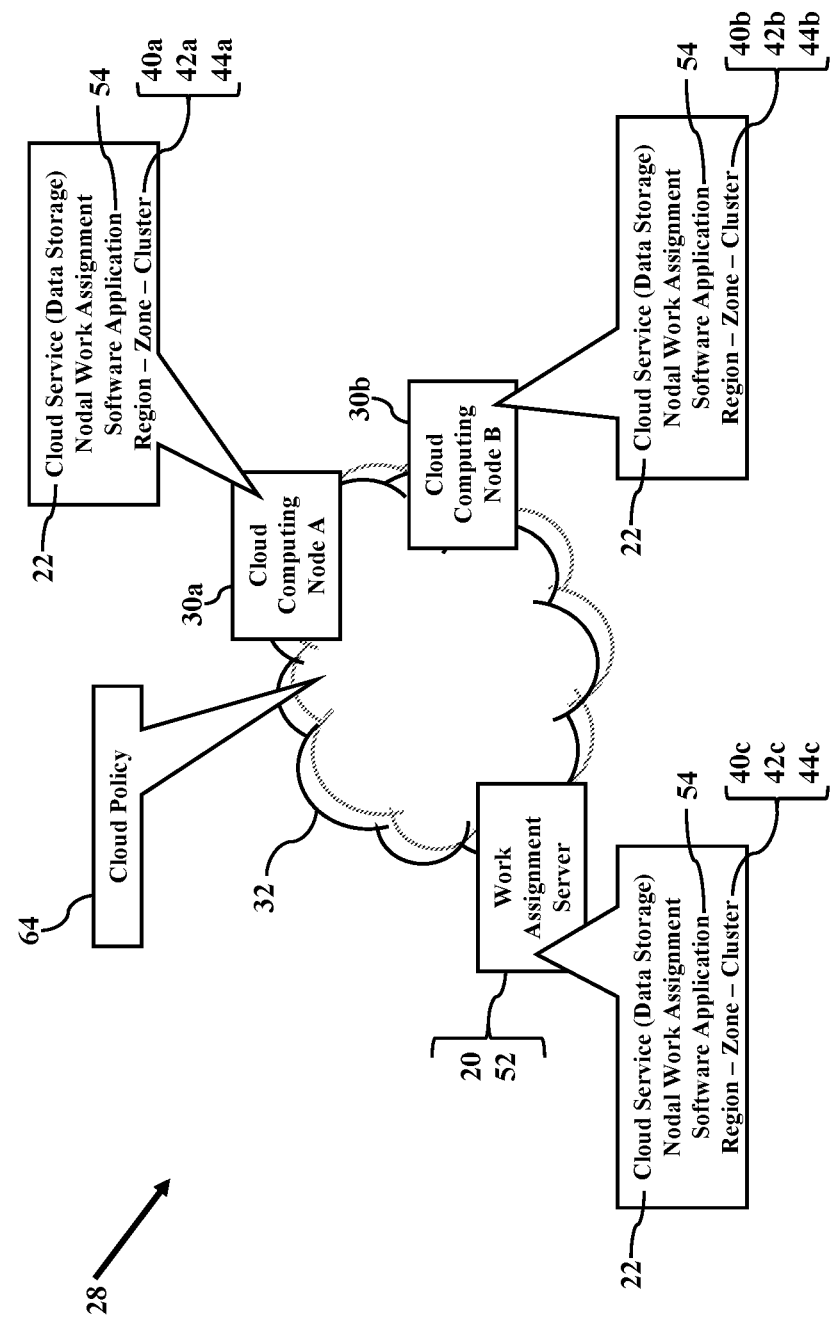
FIGS. 20-21 illustrate examples of cloud deployment.
Figure 21:
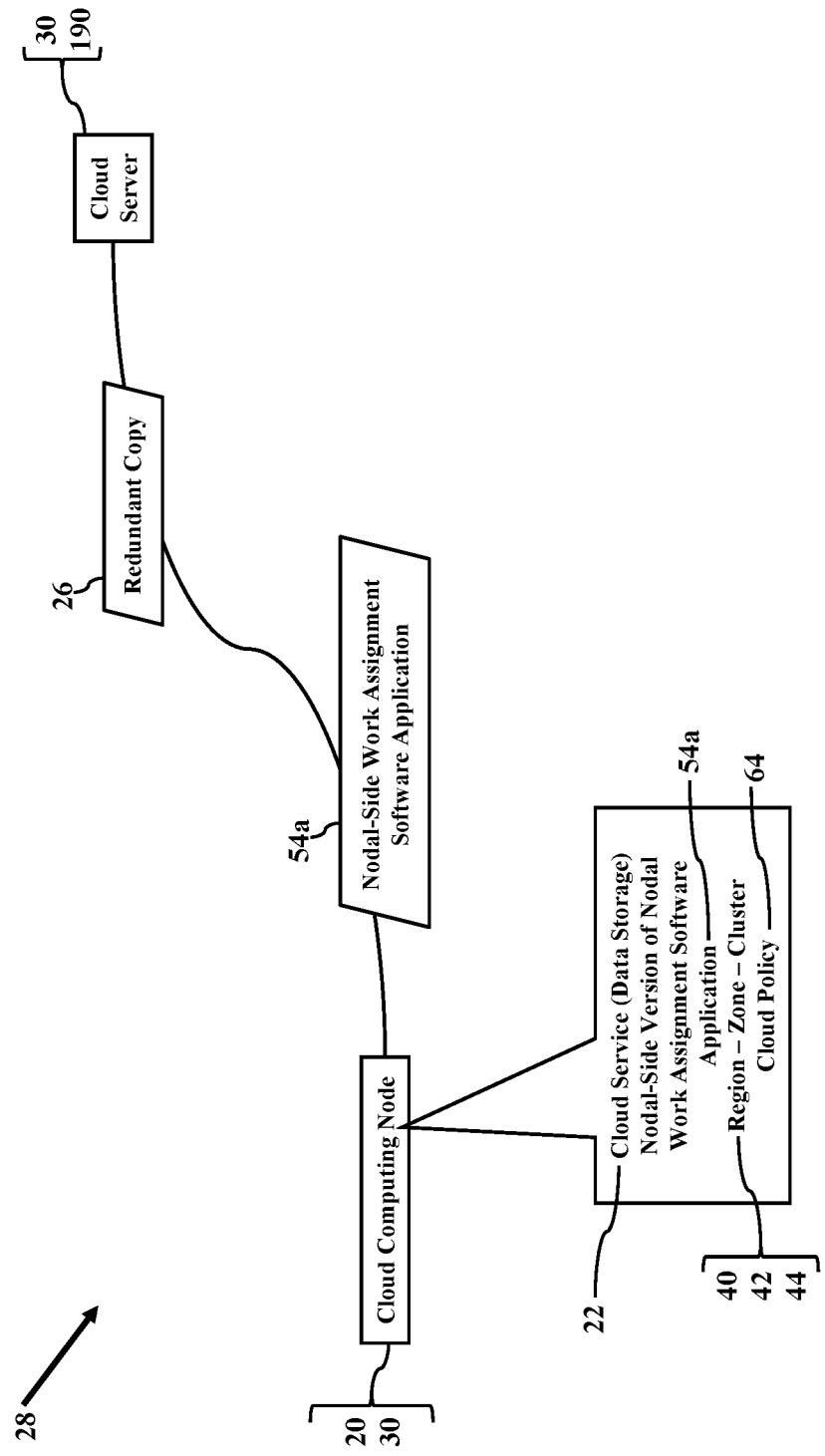

FIGS. 20-21 illustrate examples of cloud deployment. Because the nodal work assignment software application 54 is a simple and nimble work assignment solution, FIG. 20 illustrates examples of cloud distribution. The cloud computing network 28 may distribute, push, or download the work assignments 50 to the cloud computing nodes 30 operating within, or affiliated with, the cloud computing network 28. Any cloud computing node 30, in other words, may register for the cloud service 22 and receive its corresponding work assignment 50. The cloud computing nodal host 30 may then receive a service authorization to participate in the cloud service 22 and be authorized to receive or retrieve the cloud policy 64. While any architecture or mechanism may be used, FIG. 21 again illustrates cloud sourcing and delivery. That is, the cloud computing network 28 may provide a nodal-side or client-side version 54a of the nodal work assignment software application 54 to its cloud computing nodes 30. The nodal-side or client-side version 54a cooperates with the nodal work assignment software application 54 (illustrated in FIGS. 1-7) to assign the server work of storing the redundant copies 26 (perhaps, for example, in a client/server relationship). As a simple example, suppose a cloud server 190 stores and downloads the nodal-side or client-side version 54a of the nodal work assignment software application to the cloud computing node 30. The cloud computing node 30 registers with the cloud computing network 28 to participate in the cloud service 22. The cloud computing node 30 may then have permission to download the nodal-side or client-side version 54a of the nodal work assignment software application. Each participating cloud computing node 30 may then store the redundant copy 26, if assigned.

The cloud service 22 may thus automatically distributes one or more of the redundant copies 26. Whatever electronic content (e.g., an entire file, a data segment, a shard, or any other bits/bytes) each redundant copy 26 represents, the cloud service 22 disperses the R redundant copies 74 throughout the cloud computing network 28 (perhaps according to the region 40, zone 42, and/or cluster 44 as specified by the cloud policy 64). Because the R redundant copies 74 are dispersed throughout the cloud computing network 28, the cloud service 22 minimizes the risk of data loss. The cloud service 22, however, also reduces unnecessary network traffic. Duplicate copies of any data are only added when necessary (e.g., when C<R causing the under-replicated condition 90 or when regional/zonal/clusteral redistribution is required). Conventional replication schemes usually over replicate, which creates excessive server work and network traffic and incurs networking expenses.

The redundant copy 26 may be obtained via any mechanism. When the nodal work assignment software application 54 determines that any cloud computing node 30 should perform the work that stores the redundant copy 26, the nodal work assignment software application 54 may then instruct or cause the node 30 to acquire the additional redundant copy 26. While the additional redundant copy 26 may be obtained from any source, the redundant copy 26 may be cloud sourced and delivered. That is, the additional redundant copy 26 may be generated by any of the cloud computing nodes 30 affiliated with the cloud computing network 28. As a simple example, suppose the cloud server 190 is tasked with providing the additional redundant copy 26. The cloud computing environment 28, in other words, may designate the cloud server 190 as a source for each additional redundant copy 26. The nodal work assignment software application 54 may instruct the node 30 to generate and send a data replication request into the cloud computing network 28. The replication request may specify the under-replicated condition 90 and identify the electronic data 24 to be duplicated (such as a filename or identifier of shard/segment/element/structure/content). The replication request routes via the cloud computing network 28 to a network address (e.g., IP address) associated with the cloud server 190. The cloud server 190 stores either the original version of the data 24 and/or one of the C currently-existing copies 26. The cloud server 190 generates and/or retrieves the additional redundant copy 26 and sends the additional redundant copy 26 as a query response. The cloud computing network 28 routes the additional redundant copy 26 to the network address (IP address) associated with the node 30.

Redundant inventory may be updated. Because the work assignment server 52 may track the network locations 78 of the redundant copies 26, each cloud computing node 30 may inform the work assignment server 52 of its local storage of the additional redundant copy 26. That is, when any node 30 completes its work assignment 50 that stores the redundant copy 26, the node 30 may send a message or other update to the work assignment server 52. The work assignment server 52 may thus be a collection destination for updated work assignments 50 sent by the cloud computing nodes 30 participating in the cloud service 22. When the work assignment server 52 receives the message update, the work assignment server 52 may confirm and update redundancy storage inventory records to indicate that the node 30 successfully stores the additional redundant copy 26.

Still more examples include a data redundancy inventory. Because the cloud policy 64 may identify the network location 78 (e.g., the region 40, zone 42, cluster 44, and/or IP address) associated with each currently-existing redundant copy C (illustrated as reference numeral 76), the cloud policy 64 may also specify a complete data redundancy inventory maintained by the cloud computing network 28. The cloud policy 64 may thus further specify the current count C of the duplicate copies stored at their respective network locations 78. For example, the cloud policy 64 may specify the current count C of the duplicate copies according to hierarchical region 40, zone 42, cluster 44, and cloud computing node 30. The cloud policy 64 may specify the required copy counts R by the region 40, the zone 42, the cluster 44, and/or the cloud computing node 30. The cloud policy 64, in other words, may provide individual target R and current counts C by the region 40, zone 42, cluster 44, and/or individual cloud computing node 30. By inspecting and analyzing the cloud policy 64, the nodal work assignment software application 54 may modify and optimize the work assignments 50.

The cloud computing network 28 thus automatically distributes one or more of the redundant copies 26 onto the cloud computing nodes 30. This data redundancy minimizes the risk of data loss while also not burdening the cloud computing network 28 with unnecessary server work and packet traffic. Redundant files and other data are only transferred when necessary (for example, when C<R and destination eligible). Conventional schemes cause too much shuffling of data that bogs servers, that clogs networks, and that is very costly (e.g., $/byte of network traffic). The global or overall cloud policy 64 may specify, for example, that for each segment (such as a data file that is required to have R copies of for resilience, with perhaps each redundant copy 26 in a unique or different zone 42). The cloud policy 64 may specify, and/or the nodal work assignment software application 54 may check, whether the segment, file, or other electronic data 24 is under-replicated (less than R copies exist) or over-replicated (more than R copies exist).

Figure 22:
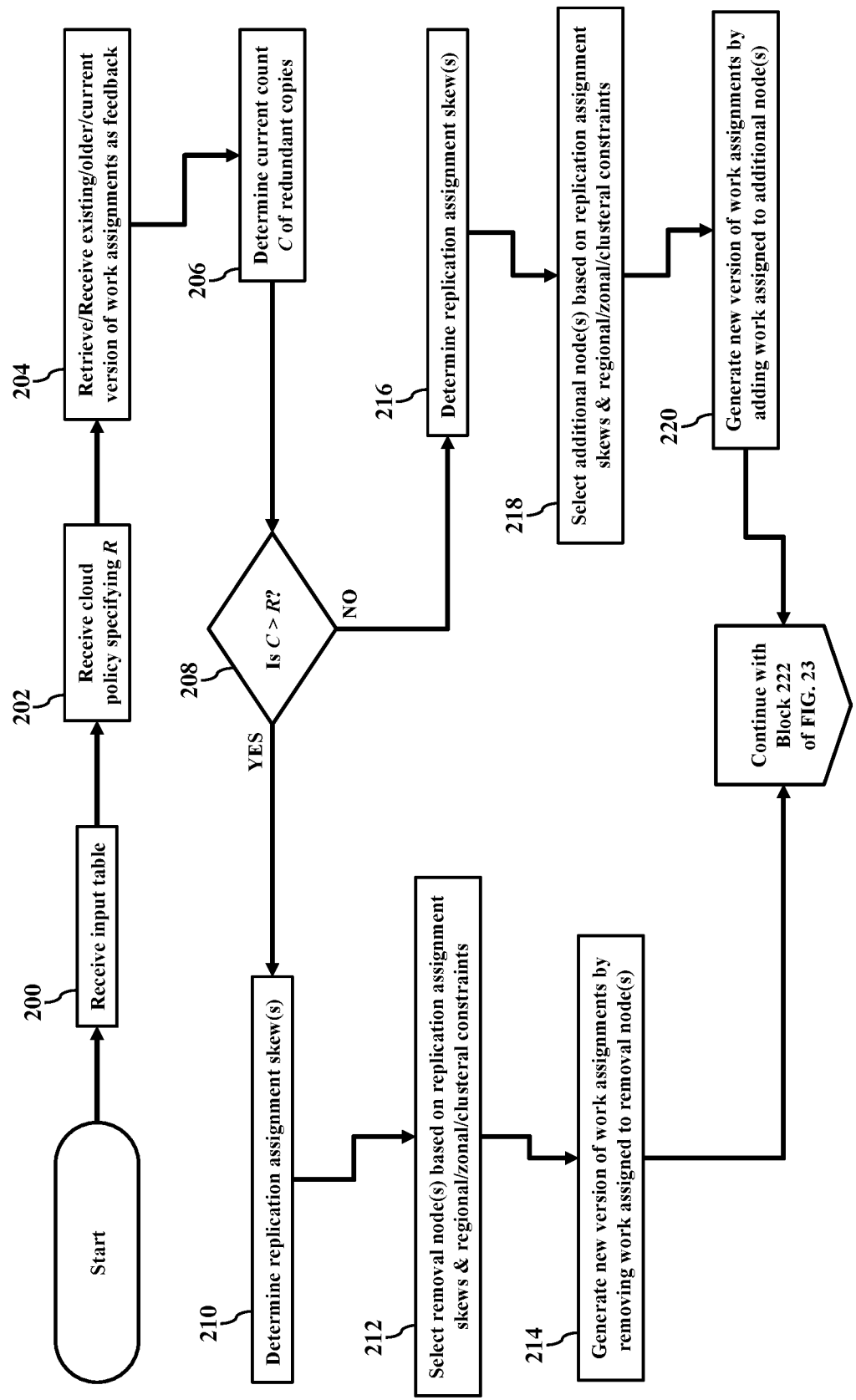
FIGS. 22-23 illustrate more examples of operations or methods that manage redundant copies of electronic data.
Figure 23:
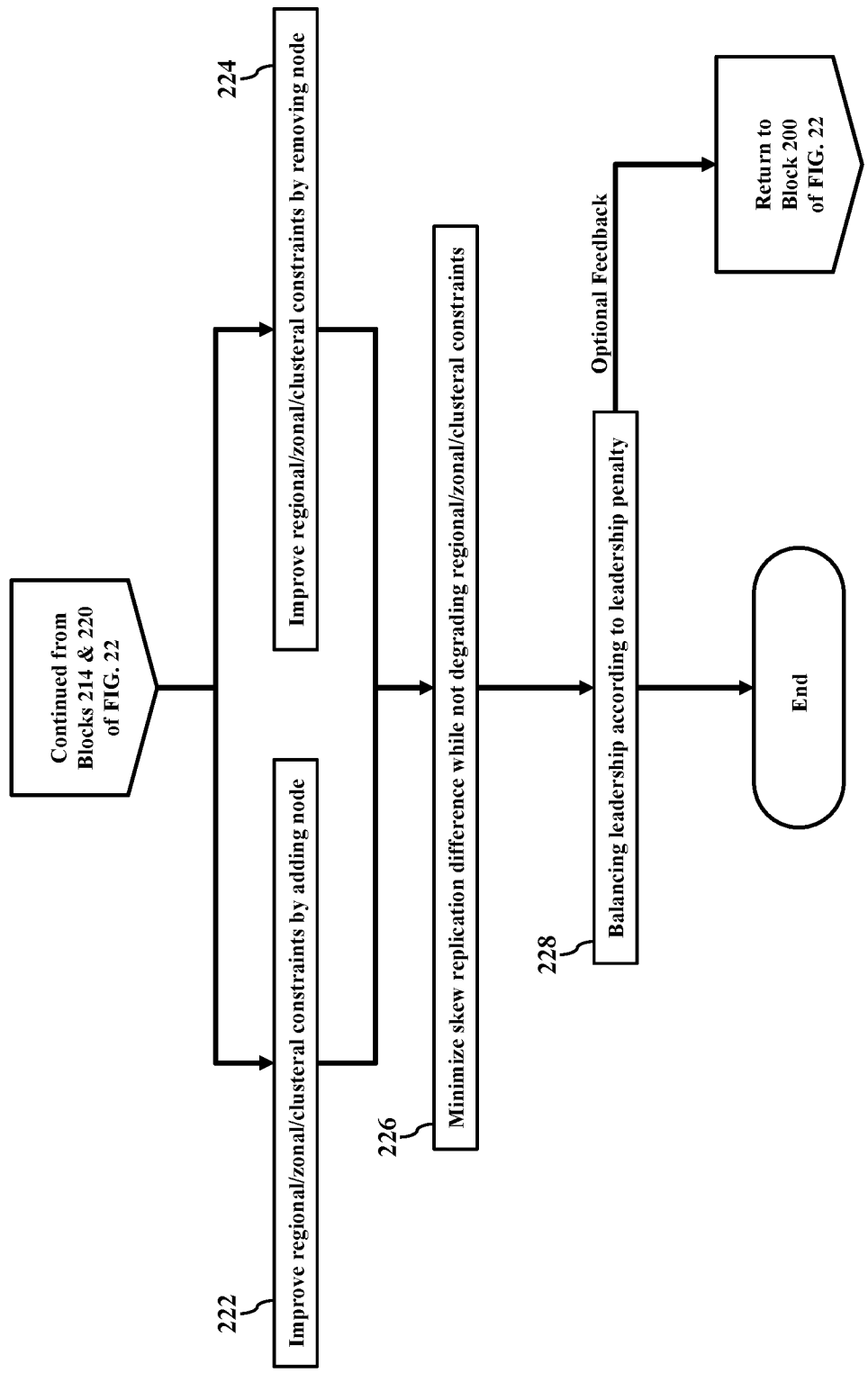

FIGS. 22-23 illustrate examples of operations or methods that manage the redundant copy 26 of the electronic data 24. The computer system 20 (such as the work assignment server 52) receives the input table 188 (Block 200). The computer system 20 also receives the cloud policy 64 associated with the input table 188 that specifies the logical rules 70 and other parameters associated with the cloud service 22 (Block 202). The computer system 20 retrieves or receives the existing/older/current version 62 of the work assignments 50 as feedback (Block 204). The computer system 20 determines the current count C of the redundant copies 26 (Block 206). If the electronic data 24 is over-replicated (Block 208), then the computer system 20 may determine the replication assignment skews 80 (Block 210) and select a removal node 30 based on the replication assignment skews 80 and the regional/zonal/clusteral constraints 94 (Block 212). The computer system 20 generates the new version 60 of the work assignments 50 by removing the work assigned to the selected removal node 30 (Block 214). However, if the electronic data 24 is under-replicated (Block 208), then the computer system 20 may determine the replication assignment skews 80 (Block 216) and select an additional node 30 based on the replication assignment skews 80 and the regional/zonal/clusteral constraints 94 (Block 218). The computer system 20 generates the new version 60 of the work assignments 50 by adding an additional work assignment 50 to the selected additional node 30 (Block 220).

The flowchart continues with FIG. 23. Once the new version 60 of the work assignments 50 is generated (see Blocks 214 and 220 of FIG. 22), the computer system 20 may also further modify the new version 60 of the work assignments 50 by adding (Block 222) or by removing (Block 224) more nodes 30 to improve the regional/zonal/clusteral constraints 94. The computer system 20 may also further modify the new version 60 of the work assignments 50 by minimizing the skew replication difference 100 while not degrading the regional/zonal/clusteral constraints 94 (Block 226). The computer system 20 may also further modify the new version 60 of the work assignments 50 by balancing the leadership 110 according to the leadership penalty 112 (Block 228). If desired, the new version 60 of the work assignments 50 may be re-input as feedback (Block 200).

Figure 24:
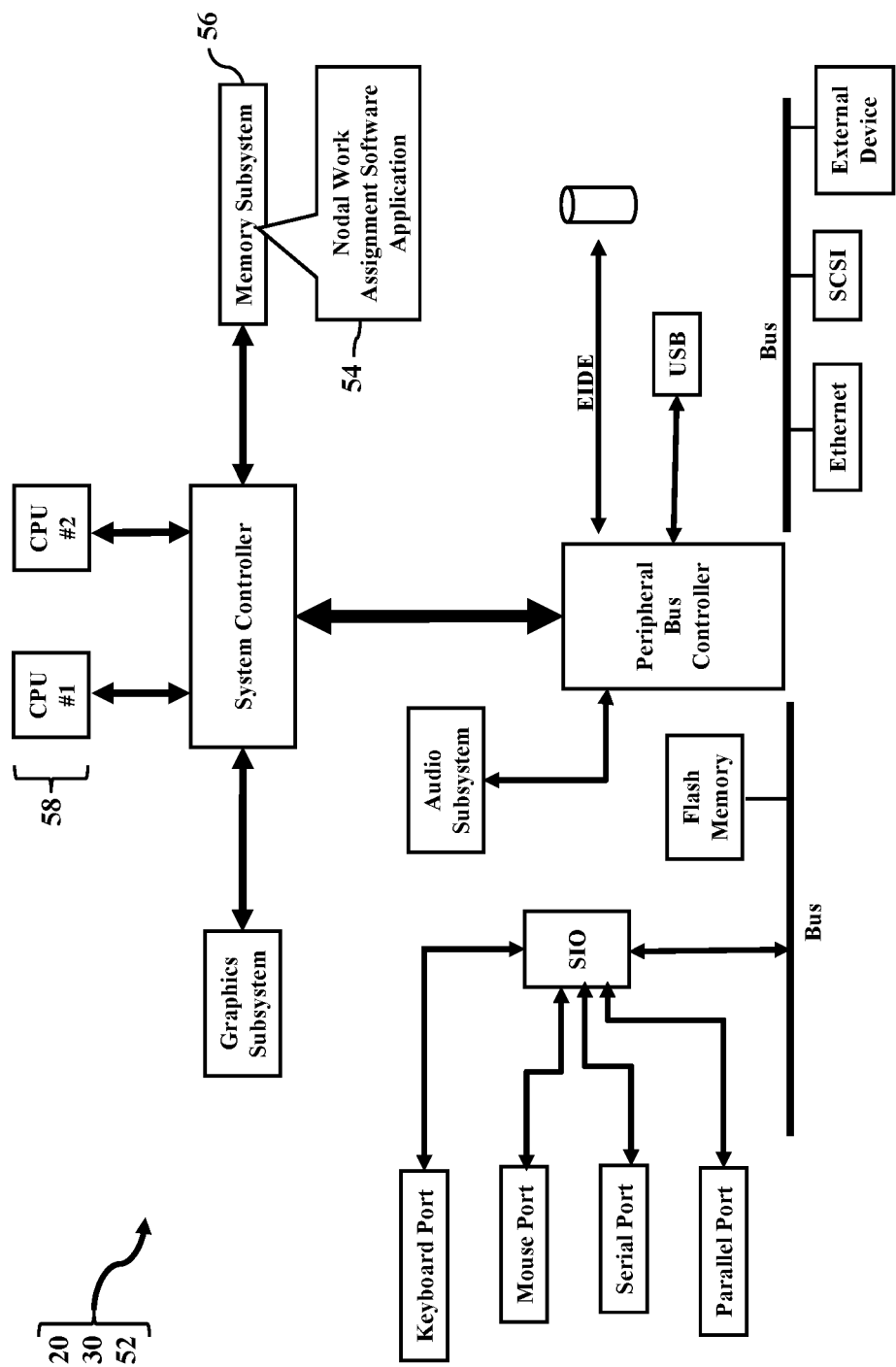
FIG. 24 illustrates a more detailed example of an operating environment.

FIG. 24 illustrates a more detailed example of the operating environment. FIG. 24 is a more detailed block diagram illustrating the computer system 20 (such as the cloud computing node 30 and the work assignment server 52). The nodal work assignment software application 54 is stored in the memory subsystem or device 56. One or more of the processors 58 communicate with the memory subsystem or device 56 and execute the nodal work assignment software application 54. Examples of the memory subsystem or device 56 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 20 may have any embodiment. As this disclosure explains, the computer system 20 may be embodied as any processor-controlled information handling system. The computer system 20 may be embodied as a server, a switch, a router, a storage component, and/or a management component. The computer system 20 may also be embodied as a smartphone, a tablet computer, a smartwatch, a television, an audio device, a remote control, and/or a recorder. The computer system 20 may also be embodied as a smart appliance, such as washers, dryers, and refrigerators. Indeed, as cars, trucks, and other vehicles grow in electronic usage and in processing power, the nodal work assignment software application 54 may be easily incorporated into any vehicular controller.

The above examples of nodal work assignments 50 may be applied regardless of the networking environment. The nodal work assignment software application 54 may be easily adapted to execute in stationary or mobile devices having wide-area networking (e.g., 4G/LTE/5G cellular), wireless local area networking (WI-FI®), near field, and/or BLUETOOTH® capability. The nodal work assignment software application 54 may be applied to stationary or mobile devices utilizing any portion of the electromagnetic spectrum and any signaling standard (such as the IEEE 802 family of standards, GSM/CDMA/TDMA or any cellular standard, and/or the ISM band). The nodal work assignment software application 54 however, may be applied to any processor-controlled device operating in the radio-frequency domain and/or the Internet Protocol (IP) domain. The examples may be applied to any processor-controlled device utilizing a distributed computing network, such as the Internet (sometimes alternatively known as the "World Wide Web"), an intranet, a local-area network (LAN), and/or a wide-area network (WAN). The examples may be applied to any processor-controlled device utilizing power line technologies, in which signals are communicated via electrical wiring. Indeed, the many examples may be applied regardless of physical componentry, physical configuration, or communications standard(s).

The computer system 20 may utilize any processing component, configuration, or system. For example, the examples may be easily adapted to any desktop, mobile, or server central processing unit, graphics processor, ASIC, or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 20 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The examples may inspect packetized communications. When the computer system 20 communicates via any communications network, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The examples may utilize any signaling standard. The cloud computing network 28, for example, may mostly use wired networks to interconnect the cloud computing nodes 30. However, the cloud computing network 28 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing network 28 may also utilize other standards, such as the I.E.E.E. 802 family of standards, the Industrial, Scientific, and Medical band of the electromagnetic spectrum, BLUETOOTH®, low-power or near-field, and any other standard or value.

The nodal work assignment software application 54 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for generating the improved work assignments 50, as the above paragraphs explain.

The diagrams, schematics, illustrations, and the like represent conceptual views or processes illustrating examples of the modified, regenerated work assignments 50. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that assigns work among nodes associated with a cluster, comprising:
    receiving, by the computer system, a current version of work assignments associated with storing an original and redundant copies among the nodes associated with the cluster;
    determining, by the computer system, a replication assignment skew that corresponds to a node of the nodes associated with the cluster as a difference between a current nodal work assignment count and a nodal work target count;
    generating, by the computer system, a new version of the work assignments by modifying the current version based on the replication assignment skew, a target replication factor specifying a target count of the redundant copies to be stored, and a current count of the redundant copies currently stored by the cloud computing network.

2. The method of claim 1, further comprising adding the node based on the replication assignment skew.

3. The method of claim 1, further comprising removing the node based on the replication assignment skew.

4. The method of claim 1, further comprising modifying a zonal distribution based on a zonal constraint associated with the nodes.

5. The method of claim 1, further comprising determining a skew replication difference associated with the node and a candidate node of the nodes associated with the cluster, the skew replication difference based on the current nodal work assignment count and the nodal work target count determined for the node and for the candidate node.

6. The method of claim 5, further comprising selecting the candidate node based on the skew replication difference.

7. The method of claim 5, further comprising reassigning the work based on the skew replication difference.

8. A computer system that manages redundant copies of an original, comprising:
    a central processing unit; and
    a memory device storing instructions that, when executed by the central processing unit, perform operations, the operations comprising:
    receiving a current version of work assignments associated with storing an original and the redundant copies among nodes associated with a cloud computing network providing a cloud service;
    generating a replication assignment skew associated a node of the nodes as a difference between a current nodal work assignment count and a nodal work target count; and
    generating a new version of the work assignments by modifying the current version based on the replication assignment skew, a target replication factor specifying a target count of the redundant copies, and a current count of the redundant copies currently stored by the cloud computing network.

9. The computer system of claim 8, wherein the operations further comprise adding the node to the new version of the work assignments based on the replication assignment skew.

10. The computer system of claim 8, wherein the operations further comprise adding the node to the new version of the work assignments based on the replication assignment skew and a zonal constraint.

11. The computer system of claim 8, wherein the operations further comprise removing the node from the new version of the work assignments based on the replication assignment skew.

12. The computer system of claim 8, wherein the operations further comprise removing the node from the new version of the work assignment based on the replication assignment skew and a zonal constraint.

13. The computer system of claim 8, wherein the operations further comprise satisfying the target replication factor.

14. The computer system of claim 8, wherein the operations further comprise modifying a zonal distribution based on the replication assignment skew and a zonal constraint.

15. The computer system of claim 8, wherein the operations further comprise modifying the new version of the work assignments based on a skew replication difference associated with the node and a candidate node of the nodes.

16. The computer system of claim 8, wherein the operations further comprise modifying the new version of the work assignments by balancing a leadership according to a leadership penalty.

17. A memory device storing instructions that, when executed by a central processing unit, perform operations for assigning a work of storing redundant copies of an original, the operations comprising:
    receiving a current version of a work assignment table specifying work assignments associated with storing the original and the redundant copies of an electronic data among nodes associated with a cloud computing network providing a cloud service;
    generating a replication assignment skew associated a node of the nodes as a difference between a current nodal work assignment count and a nodal work target count; and
    generating a new version of the work assignment table by modifying the current version based on the replication assignment skew, a target replication factor specifying a target count of the redundant copies to be stored by the cloud computing network, and a current count of the redundant copies currently stored by the cloud computing network.

18. The memory device of claim 17, wherein the operations further comprise determining an overworked condition associated with the node based on the target count of the redundant copies and the current count of the redundant copies.

19. The memory device of claim 17, wherein the operations further comprise determining an underworked condition associated with the node based on the target count of the redundant copies and the current count of the redundant copies.

20. The memory device of claim 17, wherein the operations further comprise at least one of adding the node to, or removing the node from, the new version of the work assignment table based on the replication assignment skew and a zonal constraint.

\* \* \* \* \*